(12) United States Patent
Kinugasa et al.

(10) Patent No.: US 9,385,532 B2
(45) Date of Patent: Jul. 5, 2016

(54) ENERGY MANAGEMENT SYSTEM

(75) Inventors: Nanae Kinugasa, Kusatsu (JP);
Tomoyoshi Ashikaga, Kusatsu (JP);
Toshihiro Kanbara, Kusatsu (JP);
Naotake Shimozu, Kusatsu (JP); Koji Mishima, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 570 days.

(21) Appl. No.: 13/583,197

(22) PCT Filed: Feb. 15, 2011

(86) PCT No.: PCT/JP2011/053084
§ 371 (c)(1),
(2), (4) Date: Sep. 6, 2012

(87) PCT Pub. No.: WO2011/111477
PCT Pub. Date: Sep. 15, 2011

(65) Prior Publication Data
US 2012/0330469 A1 Dec. 27, 2012

(30) Foreign Application Priority Data
Mar. 12, 2010 (JP) .................................. 2010-055594

(51) Int. Cl.
*G05D 11/00* (2006.01)
*H02J 3/14* (2006.01)
(Continued)

(52) U.S. Cl.
CPC ................ *H02J 3/14* (2013.01); *H02J 13/001* (2013.01); *F24F 11/006* (2013.01); *F24F 2011/0094* (2013.01); *H02J 2003/143* (2013.01); *Y02B 70/3225* (2013.01); *Y04S 20/222* (2013.01)

(58) Field of Classification Search
CPC ....................................................... G05D 11/00
USPC ............... 700/286, 276; 705/412; 324/103 R
See application file for complete search history.

(56) References Cited

U.S. PATENT DOCUMENTS

| 2002/0024332 | A1* | 2/2002 | Gardner | .................... 324/103 R |
| 2004/0117330 | A1* | 6/2004 | Ehlers et al. | .................. 705/412 |
| 2009/0134231 | A1 | 5/2009 | Matsui | |

FOREIGN PATENT DOCUMENTS

| CN | 101171458 A | 4/2008 |
| CN | 101311093 A | 11/2008 |

(Continued)

OTHER PUBLICATIONS

International Preliminary Report of corresponding PCT Application No. PCT/JP2011/053084.

(Continued)

*Primary Examiner* — Tejal Gami
(74) *Attorney, Agent, or Firm* — Global IP Counselors

(57) ABSTRACT

An energy management system includes an energy management apparatus configured to mange energy supplied to equipment devices of a plurality of buildings, and a control apparatus configured to control the equipment devices in the buildings. The energy management apparatus is located superordinate to the buildings. The control apparatus is connected to the energy management apparatus. The control apparatus includes an operating status perceiving unit configured to perceive operating status of the equipment devices, and a reducing capability presentation unit configured to present a plurality of energy reducing capabilities for at least one condition to the energy management apparatus. The energy reducing capabilities are amounts of energy that can be reduced for the equipment devices based on the operating status perceived.

7 Claims, 14 Drawing Sheets

(51) Int. Cl.
*H02J 13/00* (2006.01)
*F24F 11/00* (2006.01)

(56) References Cited

FOREIGN PATENT DOCUMENTS

| JP | 2001-50797 A | 2/2001 |
|---|---|---|
| JP | 2002-176729 A | 6/2002 |
| JP | 2003-304638 A | 10/2003 |
| JP | 2005-107901 A | 4/2005 |
| JP | 2005-522164 A | 7/2005 |
| JP | 2009-81936 A | 4/2009 |

OTHER PUBLICATIONS

International Search Report of corresponding PCT Application No. PCT/JP2011/053084.
Office Action of corresponding Japanese Application No. 2010-055594 dated May 8, 2012.

* cited by examiner

|   | CONTINUATION TIME (MINUTES) | MINIMUM CAPACITY (%) |
|---|---|---|
| A | 60 | 80 |
| B | 30 | 60 |
| C | 15 | 40 |

FIG. 4

|   | REDUCING CAPABILITY (kW) | CONTINUATION TIME (MINUTES) |
|---|---|---|
| A | 25 | 60 |
| B | 50 | 30 |
| C | 100 | 15 |

FIG. 5

| | STABILITY | RESPONSE TIME (MINUTES LATER) |
|---|---|---|
| A | 100% | 5 |
| B | 70% | 15 |
| C | 50% | 30 |

| TYPE OF AIR CONDITIONER | ENERGY CONSUMPTION (kW) |
|---|---|
| AIR CONDITIONER 1 | 25 |
| AIR CONDITIONER 2 | 50 |
| AIR CONDITIONER 3 | 50 |

| | REDUCING CAPABILITY (kW) | RESPONSE TIME (MINUTES LATER) |
|---|---|---|
| A | 25 (ENERGY CONSUMPTION OF AIR CONDITIONER 1) | 5 |
| B | 75 (SUM OF ENERGY CONSUMPTIONS OF AIR CONDITIONERS 1 AND 2) | 15 |
| C | 125 (SUM OF ENERGY CONSUMPTIONS OF AIR CONDITIONERS 1, 2, AND 3) | 30 |

FIG. 14

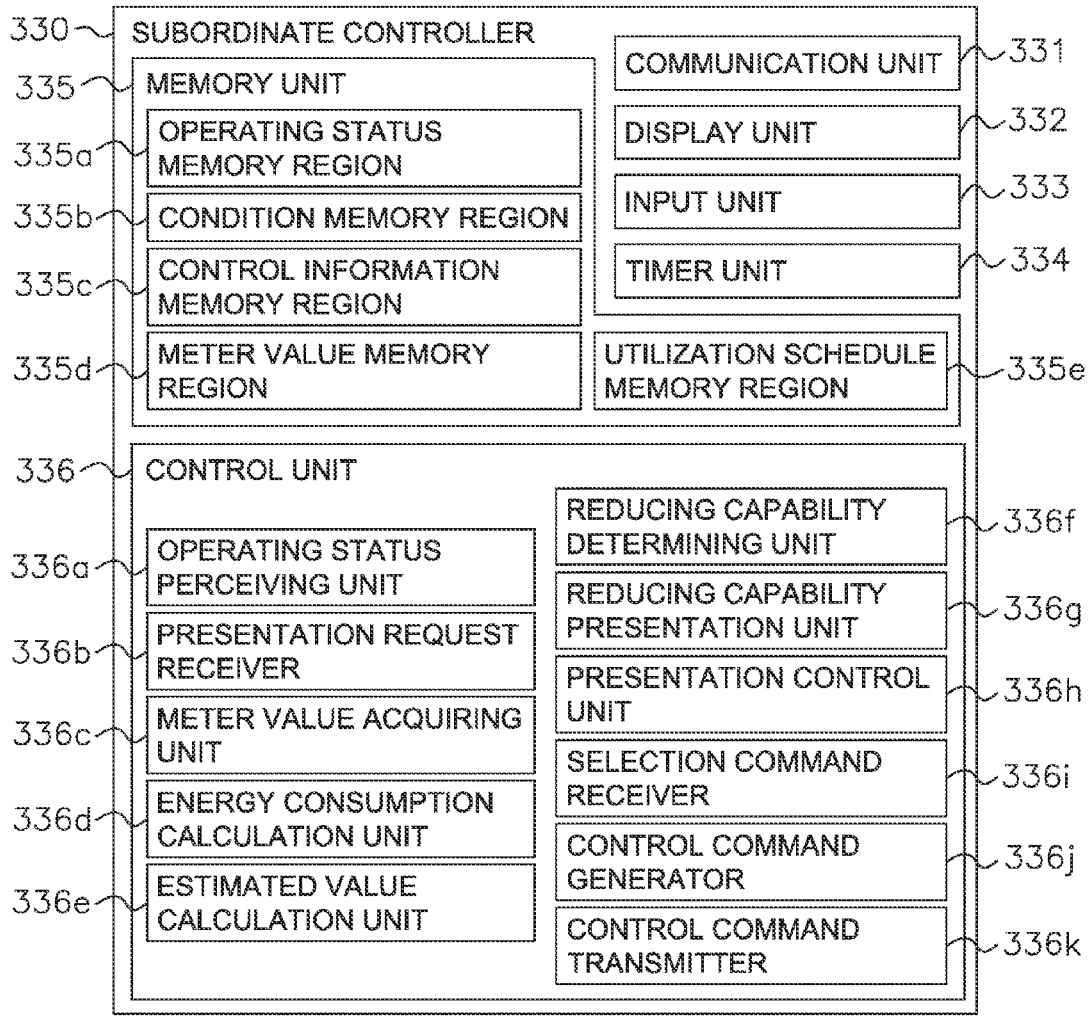

| 330 | SUBORDINATE CONTROLLER | |
|---|---|---|
| 335 | MEMORY UNIT | |
| 335a | OPERATING STATUS MEMORY REGION | |
| 335b | CONDITION MEMORY REGION | |
| 335c | CONTROL INFORMATION MEMORY REGION | |
| 335d | METER VALUE MEMORY REGION | |
| 331 | COMMUNICATION UNIT | |
| 332 | DISPLAY UNIT | |
| 333 | INPUT UNIT | |
| 334 | TIMER UNIT | |
| 335e | UTILIZATION SCHEDULE MEMORY REGION | |
| 336 | CONTROL UNIT | |
| 336a | OPERATING STATUS PERCEIVING UNIT | |
| 336b | PRESENTATION REQUEST RECEIVER | |
| 336c | METER VALUE ACQUIRING UNIT | |
| 336d | ENERGY CONSUMPTION CALCULATION UNIT | |
| 336e | ESTIMATED VALUE CALCULATION UNIT | |
| 336f | REDUCING CAPABILITY DETERMINING UNIT | |
| 336g | REDUCING CAPABILITY PRESENTATION UNIT | |
| 336h | PRESENTATION CONTROL UNIT | |
| 336i | SELECTION COMMAND RECEIVER | |
| 336j | CONTROL COMMAND GENERATOR | |
| 336k | CONTROL COMMAND TRANSMITTER | |

FIG. 15

| TIME PERIOD | CAPACITY (%) |
|---|---|
| 00:00 - 9:00 | 0 |
| 9:00 - 12:00 | 55 |
| 12:00 - 13:00 | 80 |
| 13:00 - 19:00 | 60 |
| 19:00 - 24:00 | 0 |

| | REDUCING CAPABILITY (kW) | RESPONSE TIME (MINUTES LATER) |
|---|---|---|
| A | 20 | 0 |
| B | 50 | 60 |
| C | 120 | 240 |

| TYPE OF EQUIPMENT DEVICE | ENERGY CONSUMPTION (kW) | RESPONSE TIME (MINUTES LATER) |
|---|---|---|
| LIGHT SOURCE | 25 | 0 |
| AIR CONDITIONER | 50 | 5 |
| OTHER DEVICE | 50 | 15 |

| | REDUCING CAPABILITY (kW) | RESPONSE TIME (MINUTES LATER) |
|---|---|---|
| A | 25 (REDUCING CAPABILITY FOR LIGHT SOURCES) | 0 |
| B | 75 (SUM OF REDUCING CAPABILITIES FOR LIGHT SOURCES AND AIR CONDITIONERS) | 5 |
| C | 125 (SUM OF REDUCING CAPABILITIES FOR ALL EQUIPMENT DEVICES) | 15 |

FIG. 21

ENERGY MANAGEMENT SYSTEM

CROSS-REFERENCE TO RELATED APPLICATIONS

This U.S. National stage application claims priority under 35 U.S.C. §119(a) to Japanese Patent Application No. 2010-055594, filed in Japan on Mar. 12, 2010, the entire contents of which are hereby incorporated herein by reference.

TECHNICAL FIELD

The present invention relates to an air conditioner control apparatus.

BACKGROUND ART

In a conventional technique, an energy management company that manages energy supplied to a plurality of buildings requests a reduction in power usage by each building in order to reduce the amount of energy use which is increased according to the season and/or time period. Each building presents the time period and amount of energy that can be reduced to the energy management company, and the energy management company reduces the amount of energy in accordance with the presented time period and amount of energy that can be reduced, as described in Japanese Laid-open Patent Publication No. 2005-107901.

SUMMARY

Problems that the Invention is Intended to Solve

Since a time period and an amount of energy that can be reduced are presented by each building, it is sometimes the case that the amounts of energy that can be reduced and the time periods presented by all the buildings are not appropriate as a whole. On the other hand, when the time period and the amount of energy to be reduced are determined by the energy management company in advance for all the buildings, amenity in the buildings cannot be adequately taken into account.

Therefore, an object of the present invention is to provide an energy management system that works both to reduce energy and to maintain amenity in each building.

Means for Solving the Problems

An energy management system according to a first aspect of the present invention comprises an energy management apparatus and a control apparatus. The energy management apparatus manages energy supplied to equipment devices provided to a plurality of buildings, the energy management apparatus being located superordinate to the buildings. The control apparatus controls the equipment devices in the buildings, and is connected to the energy management apparatus. The control apparatus has an operating status perceiving unit and a reducing capability presentation unit. The operating status perceiving unit perceives the operating status of the equipment devices. The reducing capability presentation unit presents to the energy management apparatus a plurality of energy reducing capabilities for each condition, which are amounts of energy that can be reduced for the equipment devices, on the basis of the operating status.

In the energy management system of the present invention, the operating status of the equipment devices is perceived in the control apparatus provided in each building. A plurality of energy reducing capabilities for each condition are presented to the energy management apparatus on the basis of the perceived operating status.

It is thereby possible to take into account both energy reducing and maintenance of amenity in the building.

An energy management system according to a second aspect of the present invention is the energy management system according to the first aspect of the present invention, wherein the conditions include one or both of a first condition and a second condition. The first condition relates to a continuation time for energy reducing of the equipment devices. The second condition relates to a start time for the energy reducing. The energy reducing capabilities vary in accordance with the continuation time for the energy reducing and the start time for the energy reducing.

In the energy management system of the present invention, the conditions include one or both of a first condition and a second condition. The first condition relates to a continuation time for energy reducing. The second condition relates to a start time for the energy reducing. The energy reducing capabilities vary in accordance with the continuation time for the energy reducing and the start time for the energy reducing.

Since energy reducing capabilities are presented which take into account the time that an effect is exerted (the continuation time and/or start time), reductions in amenity to the user can be minimized.

An energy management system according to a third aspect of the present invention is the energy management system according to the second aspect of the present invention, wherein the control apparatus further comprises an energy consumption calculation unit and an estimated consumption calculation unit. The energy consumption calculation unit calculates energy consumption on the basis of the current operating status perceived by the operating status perceiving unit. The energy consumption is the amount of energy consumed by a first control in which the energy reducing is not performed. The estimated consumption calculation unit calculates an estimated consumption. The estimated consumption is the amount of energy consumed by a second control in which the energy reducing in accordance with the conditions is performed. The reducing capability presentation unit presents the energy reducing capabilities based on the energy consumption and the estimated consumption.

In the energy management system of the present invention, an energy consumption is calculated that is the amount of energy consumed by control in which energy reducing is not performed, on the basis of the perceived current operating status. An estimated consumption is also calculated that is the amount of energy consumed when energy reducing in accordance with conditions is performed. Energy reducing capabilities based on the energy consumption and the estimated consumption are presented.

It is thereby possible to present energy reducing capabilities for each condition that are in accordance with the operating status.

An energy management system according to a fourth aspect of the present invention is the energy management system according to the second aspect of the present invention, wherein the control apparatus further comprises a memory unit. The memory unit stores individual energy reducing capabilities of the equipment devices. The reducing capability presentation unit presents the energy reducing capabilities for the entire building, based on the equipment devices performing the energy reducing in accordance with the conditions, and on the individual energy reducing capabilities stored in the memory unit.

In the energy management system of the present invention, individual energy reducing capabilities of the equipment devices are stored. The energy reducing capabilities for the overall building are presented, the energy reducing capabilities being based on the equipment devices performing the energy reducing in accordance with the conditions, and on the individual energy reducing capabilities of the equipment devices.

It is thereby possible to present energy reducing capabilities for each condition that are in accordance with the operating status.

An energy management system according to a fifth aspect of the present invention is the energy management system according to any of the first through fourth aspects of the present invention, wherein the operating status perceiving unit perceives the operating status including any one or more of the operation rate of the equipment devices, the type of the equipment devices operating, the running time of the equipment devices, the load factor of the equipment devices, and an operating schedule of the equipment devices.

In the energy management system of the present invention, the operating status includes any one or more of the operation rate of the equipment devices, the type of the equipment devices operating, the running time of the equipment devices, the load factor of the equipment devices, and an operating schedule of the equipment devices.

Energy reducing capabilities can thereby be presented that are appropriate to the operating status of the equipment devices.

An energy management system according to a sixth aspect of the present invention is the energy management system according to any of the first through fifth aspects of the present invention, wherein the equipment devices are air conditioners. The operating status perceiving unit perceives a first state and a second state. The first state is a state in which the air conditioning state of the air conditioners is stable. The second state is a state in which the air conditioning state is not stable. The reducing capability presentation unit presents the energy reducing capabilities for each the condition on the basis of the air conditioning state.

In the energy management system of the present invention, the equipment devices are air conditioners, and the reducing capability presentation unit presents the energy reducing capabilities for each condition on the basis of the air conditioning state of the air conditioners.

Energy can thereby be appropriately reduced without significantly affecting the air conditioning state.

An energy management system according to a seventh aspect of the present invention is the energy management system according to any of the first through sixth aspects of the present invention, wherein the control apparatus further comprises a presentation control unit and a control command generator. The presentation control unit controls presentation of the energy reducing capabilities by the reducing capability presentation unit. The control command generator generates a control command. The control command is a command for realizing any energy reducing capability selected by the energy management apparatus from among the energy reducing capabilities presented. The presentation control unit includes a first processor and a second processor. The first processor restricts presentation of the energy reducing capabilities by the reducing capability presentation unit during a first time. The first time is a predetermined time period after the control command is generated. The second processor allows presentation of the energy reducing capabilities by the reducing capability presentation unit. The second time is a time different from the first time.

In the energy management system of the present invention, energy reducing capabilities for each condition are presented. A control command is generated for realizing an energy reducing capability selected by the energy management apparatus. Presentation of energy reducing capabilities is restricted for a predetermined time after the control command is generated, and energy reducing capabilities are presented other than during the predetermined time.

Too-frequent energy reducing can thereby be prevented.

An energy management system according to an eighth aspect of the present invention is the energy management system according to the seventh aspect of the present invention, wherein the control apparatus further comprises a condition memory region and an amenity determination result memory region. The condition memory region stores the conditions. The amenity determination result memory region stores an amenity determination result inputted by a user. The condition memory region updates the conditions on the basis of the determination result.

In the energy management system of the present invention, an amenity determination result inputted by a user is stored. The conditions relating to the energy reducing capabilities are updated on the basis of the determination result.

Amenity to the user can thereby be further enhanced.

Effect of the Invention

In the energy management system according to the first aspect, it is possible to take into account both energy reducing and maintenance of amenity in the buildings.

In the energy management system according to the second aspect, since energy reducing capabilities are presented which take into account the time that an effect is exerted, reductions in amenity to the user can be minimized.

In the energy management system according to the third aspect, it is possible to present energy reducing capabilities for each condition that are in accordance with the operating status.

In the energy management system according to the fourth aspect, it is possible to present energy reducing capabilities for each condition that are in accordance with the operating status.

In the energy management system according to the fifth aspect, energy reducing capabilities can be presented that are appropriate to the operating status of the equipment devices.

In the energy management system according to the sixth aspect, energy can thereby be appropriately reduced without significantly affecting the air conditioning state, in the energy management system according to the seventh aspect, too-frequent energy reducing can be prevented.

In the energy management system according to the eighth aspect, amenity to the user can be further enhanced.

BRIEF DESCRIPTION OF THE DRAWINGS

FIG. 4 is a view showing an example of the conditions used in the first embodiment.

FIG. 5 is a view showing an example of the energy reducing capabilities presented to the superordinate controller from the subordinate controller in the first embodiment.

FIG. 14 is a view showing the general configuration of the subordinate controller according to the third embodiment.

FIG. 15 is a view showing an example of the utilization schedule.

FIG. 21 is a view showing an example of the energy reducing capabilities presented to the superordinate controller from the subordinate controller in the fourth embodiment.

DESCRIPTION OF EMBODIMENTS

First Embodiment

The energy management system 100 according to a first embodiment will next be described with reference to the attached drawings.

(1) Energy Management System

Figure 1:
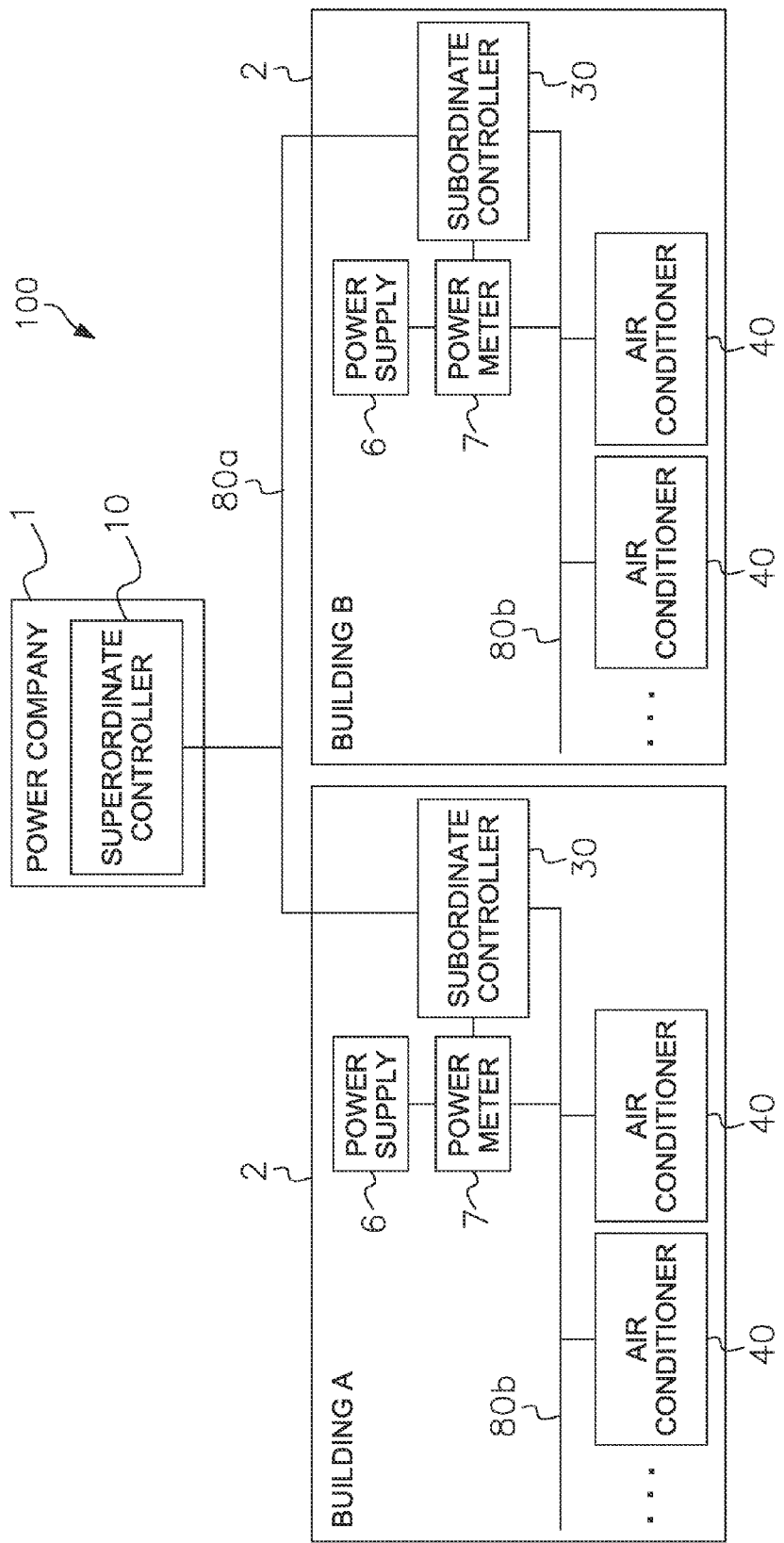
FIG. 1 is a view showing the configuration of the entire energy management system according to a first embodiment.

FIG. 1 shows the energy management system 100 of the present embodiment. The energy management system is for managing energy that is provided to buildings A, B from a power company 1. As shown in FIG. 1, the power company 1 has a superordinate controller (corresponding to an energy management apparatus) 10, and the buildings A, B have subordinate controllers (corresponding to control apparatus) 30, 30. The buildings A, B are office buildings, tenant buildings, factories, or other buildings provided with a plurality of equipment devices. The buildings A, B also have, as the plurality of equipment devices, air conditioners 40, 40, and so on, power supplies 6 for supplying electrical power to the air conditioners 40, 40, and so on, and power meters 7 for measuring the amount of energy supplied to the air conditioners 40, 40, and so on from the power supplies 6. In each of the buildings A, B, the air conditioners 40, 40, and so on and the subordinate controller 30 are connected via a dedicated control line 80b. The superordinate controller 10 and the subordinate controllers 30, 30 are connected via the Internet 80a.

In order to minimize energy consumption during periods/hours in which there is increased energy demand, the power company 1 transmits an energy reducing capability presentation request to the buildings A, B at predetermined time intervals (fifteen-minute intervals in the present embodiment). The energy reducing capability presentation request does not force the buildings A, B to perform energy reducing, but requests presentation of an energy reducing capability when energy reducing is possible in the buildings A, B. In the energy management system 100 of the present embodiment, the subordinate controllers 30, 30 described hereinafter present a plurality of amounts of energy that can be reduced (energy reducing capabilities) in the buildings A, B to the superordinate controller 10 provided at the power company 1. In the case that energy reducing is possible, the buildings A, B present a plurality of energy reducing capabilities in response to the energy reducing capability presentation request from the power company 1, and in the case that energy reducing is not possible, the buildings A, B present a response (null response or response that the energy reducing capability is 0 kW) indicating that no energy reducing is possible.

The superordinate controller 10 and subordinate controllers 30, 30 included in the energy management system 100 will next be described. Two buildings A, B as buildings managed by the power company 1 as to energy are shown in FIG. 1, but the number of buildings is not limited to two, (2) Superordinate Controller The superordinate controller 10 is provided to the power company 1, as described above, and is connected via the Internet 80a to the subordinate controller 30 provided to the building A, and to the subordinate controller 30 provided to the building B.

Figure 2:
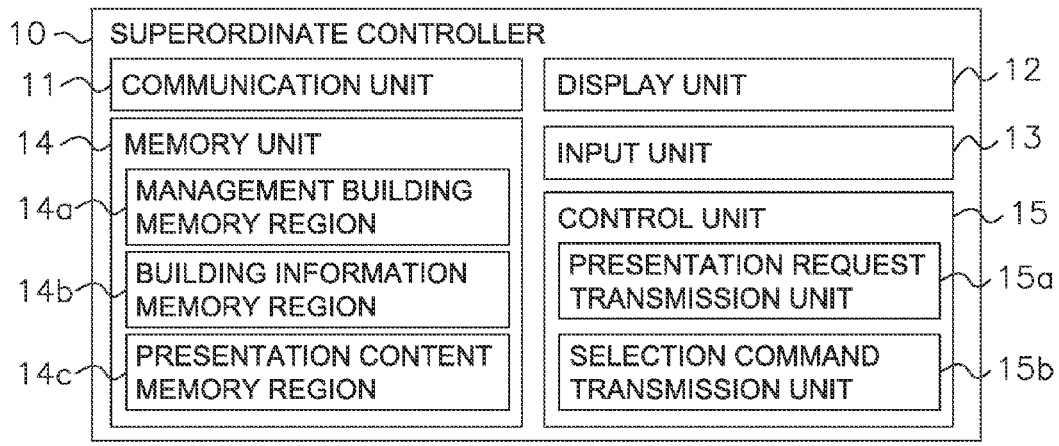
FIG. 2 is a view showing the general configuration of the superordinate controller according to the first embodiment.

The superordinate controller 10 is provided mainly with a communication unit 11, a display unit 12, an input unit 13, a memory unit 14, and a control unit 15, as shown in FIG. 2.

(Communication Unit)

The communication unit 11 is a network interface for enabling the superordinate controller 10 to connect to the Internet 80a.

(Display Unit)

The display unit 12 is composed mainly of a display. A management screen showing various items of information stored in the memory unit 14 described hereinafter is displayed by the display unit 12.

(Input Unit)

The input unit 13 is composed mainly of an operating button, a keyboard, a mouse, and other components.

(Memory Unit)

The memory unit 14 is composed mainly of a hard disk. The memory unit 14 stores a program that can be read and executed by the control unit 15. The memory unit 14 also has a management building memory region 14a, a building information memory region 14b, and a presentation content memory region 14c as main components thereof.

a) Management Building Memory Region

The buildings A, B to be managed by the power company 1 are stored in the management building memory region 14a. Specifically, the names of the buildings A, B, dimensions of the buildings A, B, and information relating to the minimum required energy and other characteristics of the buildings are stored.

b) Building Information Memory Region

Information sent from the subordinate controllers 30, 30 described hereinafter and relating to energy consumption is stored in the building information memory region 14b. The information relating to energy consumption relates to the amount of energy (energy consumption) consumed by the buildings A, B in a predetermined period, c) Presentation Content Memory Region information relating to the plurality of energy reducing capabilities presented by the subordinate controllers 30, 30 is stored in the presentation content memory region 14c.

(Control Unit)

The control unit 15 is composed primarily of a CPU, ROM, and RAM. The control unit 15 reads and executes a program stored in the memory unit 14. The control unit 15 also has a presentation request transmitter 15a and a selection command transmitter 15b as main components thereof.

a) Presentation Request Transmitter

The presentation request transmitter 15a transmits an energy reducing capability presentation request to the buildings A, B at predetermined time intervals (fifteen-minute intervals in the present embodiment).

b) Selection Command Transmitter

The selection command transmitter 15b determines the energy reducing amount required for each of the buildings A, B on the basis of a plurality of responses relating to energy reducing capabilities sent from the buildings A, B, and transmits a command (selection command) adapted to the content of the determination to the buildings A, B.

(3) Subordinate Controllers

The subordinate controllers 30, 30 are provided, one each, to the buildings A, B, as described above. The subordinate controllers 30, 30 control the air conditioners 40, 40, and so on provided to the provided buildings. The subordinate controller 30 provided to the building A is described hereinafter, but the subordinate controller 30 provided to the building B also has the same configuration.

Figure 3:
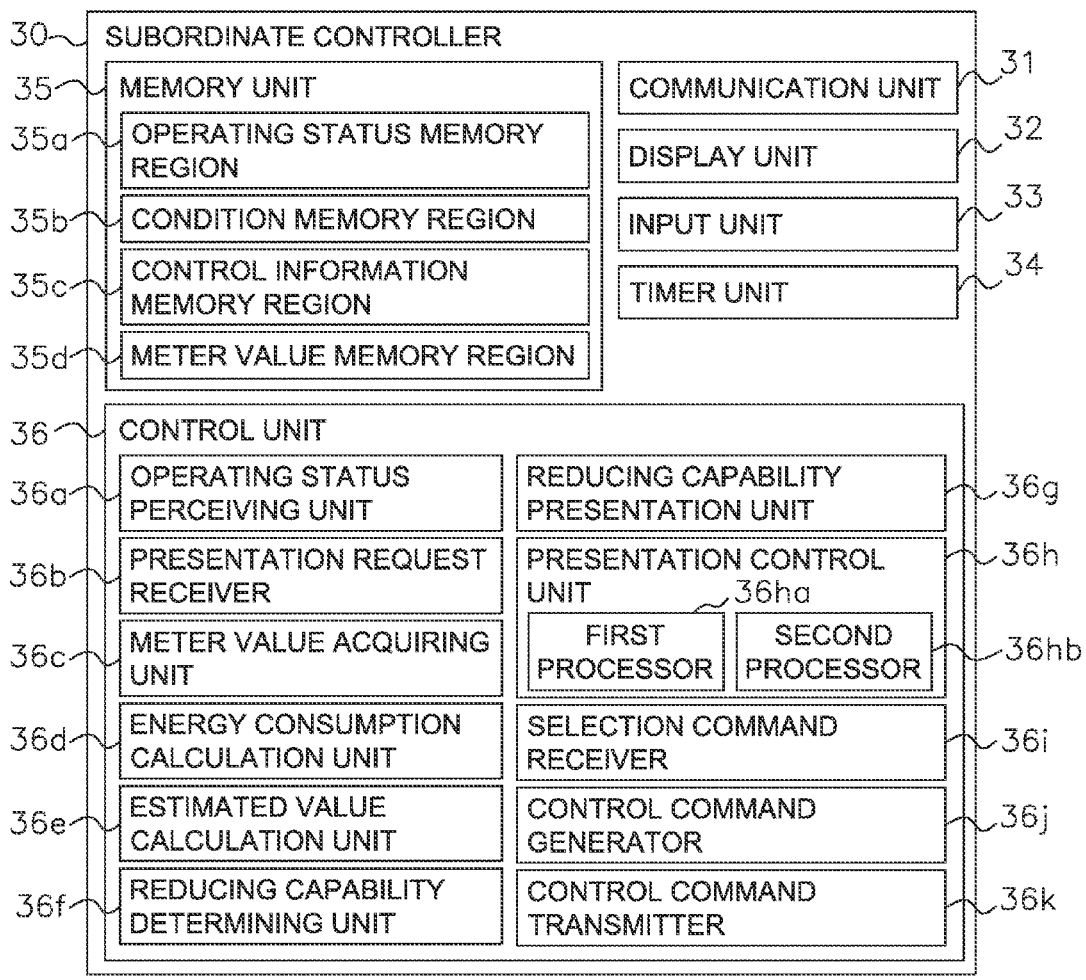
FIG. 3 is a view showing the general configuration of the subordinate controller according to the first embodiment.

The subordinate controller 30 is composed primarily of a communication unit 31, a display unit 32, an input unit 33, a timer unit 34, a memory unit 35, and a control unit 36, as shown in FIG. 3.

(Communication Unit)

The communication unit 31 is an interface for enabling the subordinate controller 30 to connect to the Internet 80a and the dedicated control line 80b.

(Display Unit)

The display unit 32 is composed primarily of a display. A screen showing the operating state (ON/OFF, operating mode (air-cooling mode/air-warming mode), direction of air flow, air volume, intake temperature, and the like) and set temperature of the air conditioners 40, 40, and so on is displayed by the display unit 32.

(Input Unit)

The input unit 33 is composed primarily of an operating button and a touch panel for covering the display.

(Timer Unit)

The timer unit 34 measures the time elapsed since transmission of a control command to the air conditioners 40, 40, and so on by a control command transmitter 36k described hereinafter.

(Memory Unit)

The memory unit 35 is composed primarily of a hard disk. The memory unit 35 stores a program that can be read and executed by the control unit 36 described hereinafter. The memory unit 35 also has, as main components, an operating status memory region 35a, a condition memory region 35b, a control information memory region 35c, and a meter value memory region 35d.

a) Operating Status Memory Region

The operating status of the air conditioners 40, 40, and so on as perceived by an operating status perceiving unit 36a described hereinafter is stored in the operating status memory region 35a. Operating status for the air conditioners 40, 40, and so on includes such conditions as operating/stopped status, set temperature, intake temperature, running time, operation rate, and operating capacity (%) when working. "Operating capacity" here means the percent capacity at which the air conditioners 40, 40, and so on are operating in relation to the rated capacity thereof.

b) Condition Memory Region

The condition memory region 35b stores conditions for presenting the plurality of energy reducing capabilities to the superordinate controller 10. The conditions for presenting the plurality of energy reducing capabilities are the prerequisites (first conditions) of the time for which energy reducing control is executed (continuation time for energy reducing control) and the operating capacity (minimum capacity) (%) during energy reducing control. Energy reducing control is control for realizing an energy reducing capability that is presented to the superordinate controller 10. The continuation time (minutes) for energy reducing control and the minimum capacity (%) allowable when the energy reducing control is performed for the continuation time are associated with each other and stored in the condition memory region 35b. FIG. 4 shows an example of the conditions (conditions A through C) stored in the condition memory region 35b. Specifically, in condition A, the minimum capacity is 80% when the continuation time is 60 minutes. In condition B, the minimum capacity is 60% when the continuation time is 30 minutes. In condition C, the minimum capacity is 40% when the continuation time is 15 minutes.

c) Control Information Memory Region

The control information memory region 35c stores the content of control commands transmitted to the air conditioners 40, 40, and so on by the control command transmitter 36k described hereinafter. Specifically, the control information memory region 35c stores information relating to an energy reducing capability selected by the superordinate controller 10 from among the plurality of energy reducing capabilities presented by a reducing capability presentation unit 36g described hereinafter. The content of the control command includes the operating capacity performed, the start time for energy reducing control, the end time for energy reducing control, and other information.

d) Meter Value Memory Region

The meter value memory region 35d stores a value acquired by a meter value acquiring unit described hereinafter, (Control Unit)

The control unit 36 is composed primarily of a CPU, ROM, and RAM, and the control unit 36 reads and executes a program stored in the memory unit 35.

The control unit 36 functions primarily as an operating status perceiving unit 36a, a presentation request receiver 36b, a meter value acquiring unit 36c, an energy consumption calculation unit 36d, an estimated value calculation unit 36e, a reducing capability determining unit 36f, a reducing capability presentation unit 36g, a presentation control unit 36h, a selection command receiver 36i, a control command generator 36j, and a control command transmitter 36k, as shown in FIG. 3.

a) Operating Status Perceiving Unit

The operating status perceiving unit 36a perceives the operating status of the air conditioners 40, 40, and so on at predetermined time intervals (five-minute intervals in the present embodiment). As described above, the operating status of the air conditioners includes such conditions as operating/stopped status, set temperature, intake temperature, running time, operation rate, and operating capacity (%) when working. The operating status of the air conditioners 40, 40, and so on as perceived by the operating status perceiving unit 36a is stored in the operating status memory region 35a described above.

b) Presentation Request Receiver

The presentation request receiver 36b receives energy reducing capability presentation requests sent from the superordinate controller 10.

c) Meter Value Acquiring Unit

The meter value acquiring unit 36c acquires values (data relating to amounts of energy) measured by the power meters 7. The values acquired by the meter value acquiring unit 36c are stored in the meter value memory region 35d described above.

d) Energy Consumption Calculation Unit

The energy consumption calculation unit 36d calculates the energy consumption of the air conditioners 40, 40, and so on for a case in which the currently performed control (first control) is continued for a predetermined time, on the basis of the current operating status perceived by the operating status perceiving unit 36a and the values stored in the meter value memory region. The predetermined time in this instance is the continuation time (e.g., 60 minutes, 30 minutes, 15 minutes) stored in the condition memory region 35b. Specifically, the energy consumption calculation unit 36d calculates the energy consumption for a case in which the air conditioners 40, 40, and so on are controlled for 60 minutes without changing the current settings thereof, the energy consumption for a case in which the air conditioners 40, 40, and so on are controlled for 30 minutes without changing the current settings thereof, and the energy consumption for a case in which the air conditioners 40, 40, and so on are controlled for 15 minutes without changing the current settings thereof.

e) Estimated Value Calculation Unit

The estimated value calculation unit 36e calculates the amount of energy consumed (estimated consumption) when energy reducing control (second control) is performed in accordance with each condition. Specifically, the estimated value calculation unit 36e calculates the amount of energy consumed when the air conditioners 40, 40, and so on are controlled at a predetermined minimum capacity for the duration of the continuation time stored in the condition memory region 35b (see FIG. 4). More specifically, the estimated value calculation unit 36e calculates the amount of energy consumed (estimated consumption) when the second control is continued for 60 minutes at a minimum capacity of 80%. The estimated value calculation unit 36e also calculates the amount of energy consumed (estimated consumption) when the second control is continued for 30 minutes at a minimum capacity of 60%. The estimated value calculation unit 36e also calculates the amount of energy consumed (estimated consumption) when the second control is continued for 15 minutes at a minimum capacity of 40%.

f) Reducing Capability Determining Unit

The reducing capability determining unit 36f determines energy reducing capabilities on the basis of the energy consumptions calculated by the energy consumption calculation unit 36d and on the basis of the estimated consumptions calculated by the estimated value calculation unit 36e. Specifically, the energy reducing capability determined is the difference between the energy consumption according to the current settings and the energy consumption (estimated consumption) for a case in which the current settings are changed according to a condition. More specifically, the energy reducing capability is determined by the following equation: Total energy reducing capability (kW)=Σ(Energy consumption−Estimated consumption). The estimated consumption is the product of the rated power (kW) and the minimum capacity (%).

The reducing capability determining unit 36f determines the energy reducing capability for each condition stored in the condition memory region 35b. Specifically, three energy reducing capabilities corresponding to the conditions A through C are determined in the present embodiment, Specifically, the continuation time for energy reducing control and the reducing capability (kW) that can be realized in the continuation time are determined, as shown in FIG. 5.

g) Reducing Capability Presentation Unit

The reducing capability presentation unit 36g presents to the superordinate controller 10 the plurality of energy reducing capabilities for each condition, determined by the reducing capability determining unit 36f. The plurality of energy reducing capabilities presented by the reducing capability presentation unit 36g are sent to the superordinate controller 10 via the communication unit 31.

The reducing capability presentation unit 36g presents energy reducing capabilities in accordance with control performed by the presentation control unit 36h described hereinafter. Specifically, the reducing capability presentation unit 36g presents an energy reducing capability to the superordinate controller 10 when presentation of energy reducing capabilities is allowed by the presentation control unit 36h. In the case that presentation of energy reducing capabilities is restricted by the presentation control unit 36h, the reducing capability presentation unit 36g presents to the superordinate controller 10 a null response or a response that the energy reducing capability is 0 kW.

h) Presentation Control Unit

The presentation control unit 36h controls presentation of energy reducing capabilities by the reducing capability presentation unit 36g described above. Specifically, the presentation control unit 36h has a first processor 36ha and a second processor 36hb. The first processor 36ha restricts presentation of energy reducing capabilities by the reducing capability presentation unit 36g. Specifically, the first processor 36ha restricts presentation of energy reducing capabilities by the reducing capability presentation unit 36g for a predetermined time (corresponding to the first time) after a control command relating to energy reducing control is generated by the control command generator 36j described hereinafter. Here, the predetermined time period after a control command relating to energy reducing control is generated is the time (continuation time) for which energy reducing control is continued. The restricting by the first processor 36ha of presentation of energy reducing capabilities causes the reducing capability presentation unit 36g described above to present to the superordinate controller 10 a null response or a response that the energy reducing capability is 0 kW, The second processor 36hb allows presentation of energy reducing capabilities by the reducing capability presentation unit 36g. Specifically, the second processor 36hb allows presentation of energy reducing capabilities by the reducing capability presentation unit 36g during the time (corresponding to the second time) which energy reducing control is not being executed.

i) Selection Command Receiver

The selection command receiver 36i receives a selection command sent from the superordinate controller 10. The selection command is a signal indicating the energy reducing capability that is selected by the superordinate controller 10 from among the plurality of energy reducing capabilities presented by the reducing capability presentation unit 36g.

j) Control Command Generator

The control command generator 36j generates a control command to realize an energy reducing capability on the basis of a selection command received by the selection command receiver 36i.

k) Control Command Transmitter

The control command transmitter 36k transmits a control command generated by the control command generator 36j to the air conditioners 40, 40, and so on. The air conditioners 40, 40, and so on thereby execute control that is based on the control command.

(4) Flow of Processing

Figure 6A:
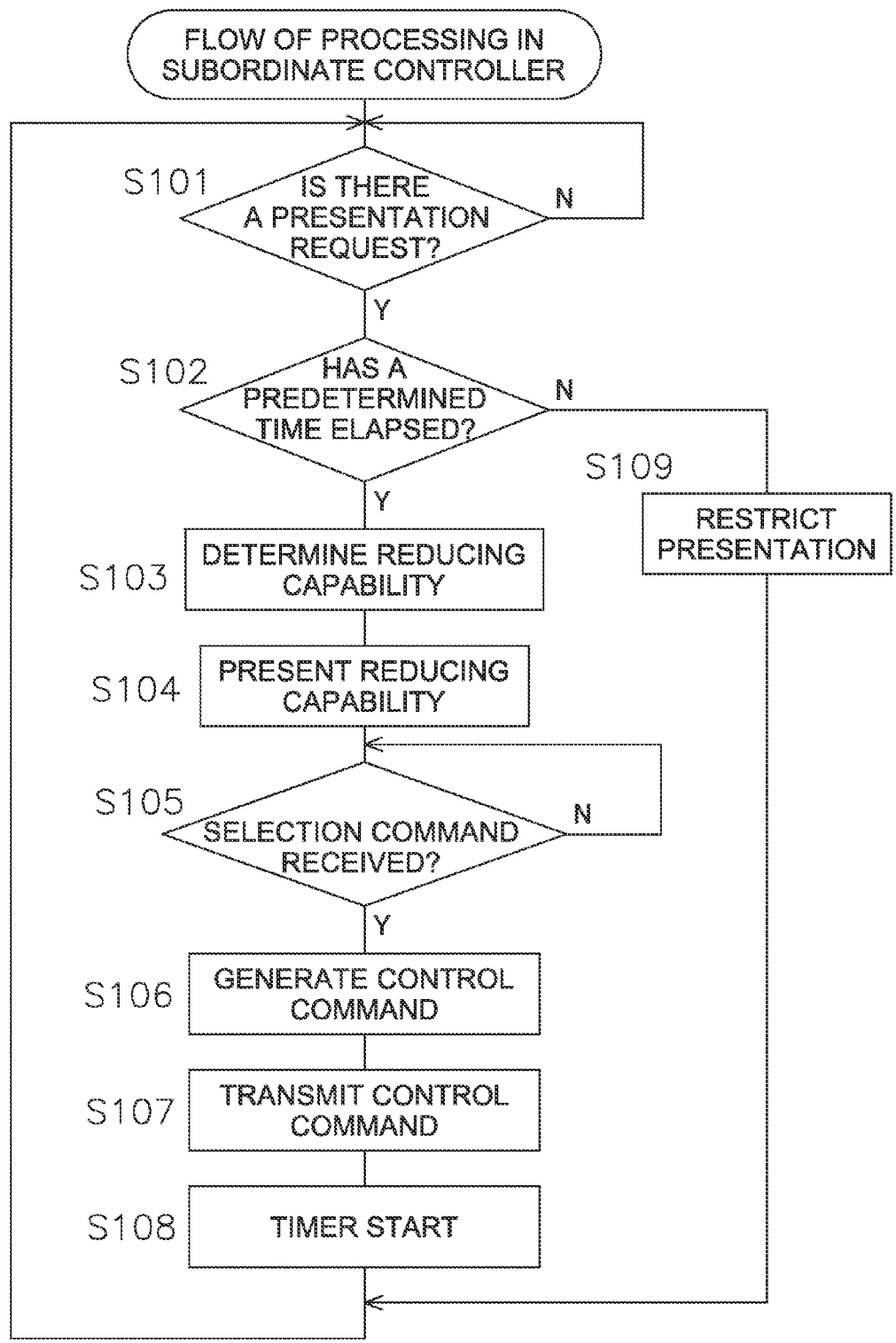
FIG. 6A is a view showing the flow of processing in the subordinate controller according to the first through fourth embodiments.

The flow of processing in the subordinate controller 30 will next be described with reference to FIG. 6A.

In step S101, the presentation request receiver 36b determines whether an energy reducing capability presentation request has been received. When an energy reducing capability presentation request has been received in step S101, the process proceeds to step S102, and when an energy reducing capability presentation request has not been received, the process waits until such a request is received.

In the next step S102, a determination is made as to whether the elapsed time measured by the timer unit 34 exceeds a predetermined time. The predetermined time here is the continuation time for energy reducing control, as described above. When the elapsed time measured by the timer unit has exceeded the predetermined time in step S102, the process proceeds to step S103, and when the elapsed time has not exceeded the predetermined time, the process proceeds to step S109.

In step S103, an energy reducing capability for each condition is determined by the reducing capability determining unit 36f, and the process proceeds to step S104. In step S104, the plurality of energy reducing capabilities are presented to the superordinate controller by the reducing capability presentation unit 36g.

The process then proceeds to step S105, and a determination is made as to whether a selection command from the superordinate controller 10 has been received. Here, the selection command is a signal indicating the energy reducing capability that is selected by the superordinate controller 10 from among the plurality of energy reducing capabilities presented by the reducing capability presentation unit 36g, as described above. In step S105, when a selection command has been received, the process proceeds to step S106. When a selection command has not been received in step S105, the process waits until a selection command is received.

In the next step S106, a control command based on the selection command is generated, the process then proceeds to step S107, and the control command is transmitted to the air conditioners 40, 40, and so on. In step S108, measurement by the timer unit 34 begins, and the process returns to step S101.

In step S102, when the elapsed time measured by the timer unit 34 has not exceeded the predetermined time, presentation of energy reducing capabilities by the reducing capability presentation unit 36g is restricted in step S109. Specifically, the reducing capability presentation unit 36g presents to the superordinate controller 10 a null response or a response that the energy reducing capability is 0 kW. The process then returns to step S101.

<Features>

(1)

Energy supplied to buildings A, B from the power company 1 is managed by the energy management system 100 of the present embodiment. In order to minimize the amount by which energy use increases according to season and/or time period, the power company 1 regularly seeks presentation of an energy reducing capability from numerous buildings. In the conventional technique, even when an energy reducing capability is presented to the power company from each building, the overall amount of energy reducing is sometimes inadequate. In such cases, when a control command for realizing an overall adequate amount of energy reducing is transmitted from the power company to the buildings, adequate amenity is not maintained in the buildings. Meanwhile, when the needs of the buildings are given priority, energy cannot be reduced by an adequate amount at the power company.

In the energy management system 100 of the present embodiment, a plurality of energy reducing capabilities for each condition are presented by the subordinate controllers 30, 30 provided to the buildings A, B. The conditions used herein are a combination of continuation time and minimum capacity, in order to maintain adequate amenity in the building. The combinations in the conditions are specifically configured so that energy reducing control is executed for a longer time when the minimum capacity is high (i.e., when the degree of energy reducing is small), and so that energy reducing control is executed for a shorter time when the minimum capacity is low (i.e., when the degree of energy reducing is large). Since the subordinate controllers 30, 30 present the energy reducing capability for each condition to the superordinate controller 10, the superordinate controller 10 can also select the appropriate option in terms of the overall amount of energy reducing for each building. It is thereby possible to simultaneously address both the minimization of energy consumption and the maintenance of amenity in the building.

(2)

In the present embodiment, a plurality of energy reducing capabilities are presented on the basis of the energy consumption for a case in which the current operating status continues, and on the basis of the estimated consumption for a case in which the current operating status changes according to conditions. Consequently, energy can be reduced in a reasonable range that reflects the current operating status.

(3)

In the energy management system 100 of the present embodiment, when the plurality of energy reducing capabilities are presented to the superordinate controller 10 by the reducing capability presentation unit 36g, the superordinate controller 10 selects one energy reducing capability from the plurality of energy reducing capabilities. Then, when the selection command receiver 36i receives a selection command from the superordinate controller 10, a control command for realizing the energy reducing capability selected in the selection command is transmitted to the air conditioners 40, 40, and so on. The air conditioners 40, 40, and so on execute energy reducing control to realize the energy reducing capability selected by the superordinate controller 10, on the basis of the control commands generated by the subordinate controllers 30, 30.

The plurality of energy reducing capabilities here are values Obtained on the basis of conditions which are combinations of continuation time and minimum capacity. Specifically, the air conditioners 40, 40, and so on are controlled on the basis of selected conditions (continuation times and minimum capacities). Meanwhile, energy reducing capability presentation requests regularly arrive from the superordinate controller 10. In a configuration in which an energy reducing capability is presented by the reducing capability presentation unit 36g each time an energy reducing capability presentation request is sent, the settings of the air conditioners 40, 40, and so on are frequently changed. Such a configuration is undesirable from the perspective of maintaining amenity. In the present embodiment, however, presentation of energy reducing capabilities by the reducing capability presentation unit 36g is restricted by the presentation control unit 36h. The present embodiment is thus designed so that while the subordinate controllers 30, 30 are controlling (energy reducing control) the air conditioners 40, 40, and so on to realize the energy reducing capability, a null response or a response that the energy reducing capability is 0 kW is made to the energy reducing capability presentation request, and no further changes are made.

Amenity can thereby be maintained in the buildings.

<Modifications>

(A)

An example of the energy management system 100 of the present embodiment was described in which the amount of energy for the buildings A, B is managed by the superordinate controller 10 provided to the power company 1. However, the energy management system 100 may also be used in a configuration in which a superordinate controller 10 provided to a parent company manages the amount of energy for a subsidiary company.

(B) The timer unit 34 measures time in step S108 in the flow (see FIG. 6A) described in the present embodiment, but the timer unit 34 may measure time at another time. For example, measurement of time may begin after a selection command is determined to have been received in step S105, or after a control command is generated in step S106.

Specifically, a configuration may be adopted in which control is performed so that there is no need for new presentation of energy reducing capabilities, or so that new selection commands are not received while the subordinate controllers 30, 30 are performing energy reducing control in response to a selection command sent from the superordinate controller 10. The subordinate controllers 30, 30 can thereby more stably control the air conditioners 40, 40, and so on.

(C)

Figure 6B:
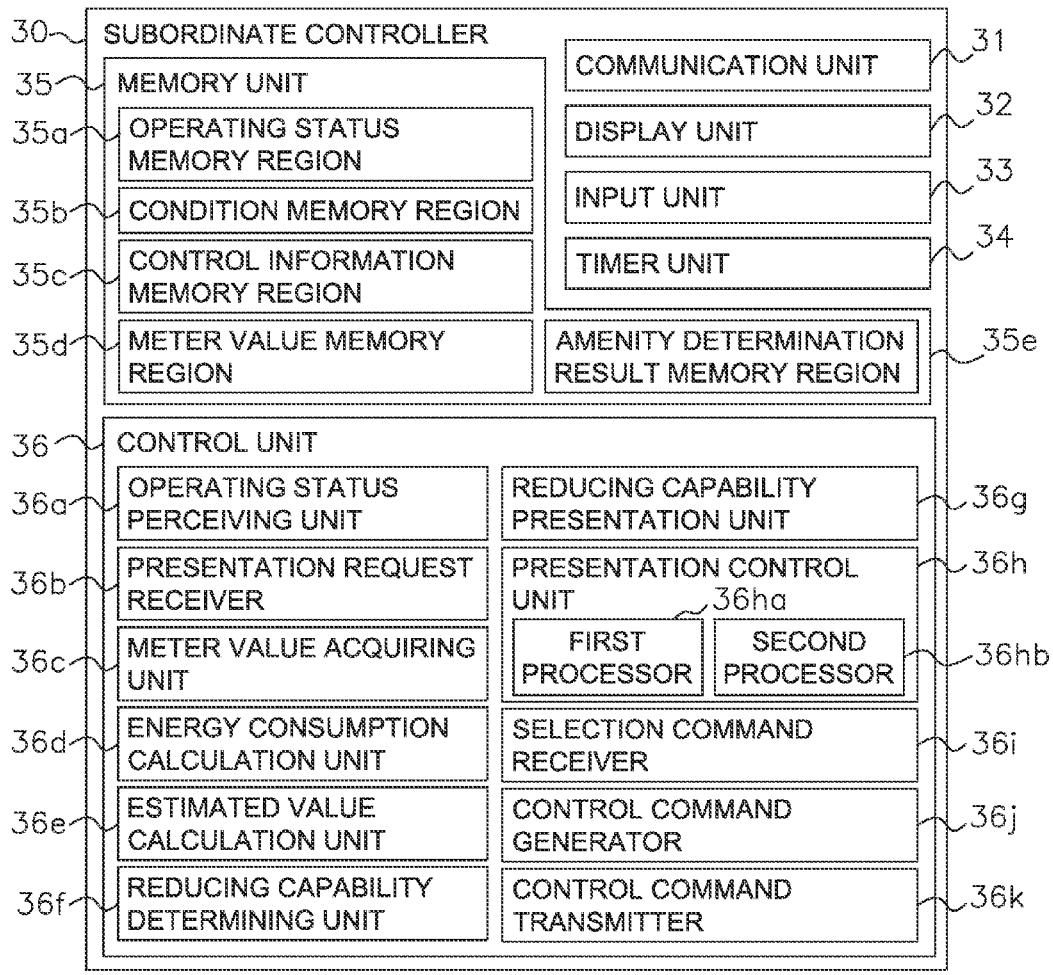
FIG. 6B is a view showing the general configuration of the subordinate controller according to the Modification (C) of the first embodiment

In the subordinate controllers 30, 30 of the present embodiment, the memory unit 35 may be further provided with an amenity determination result memory region 35e, as shown in FIG. 6B. The amenity determination result memory region 35e stores an amenity determination result inputted by a user. Specifically, when a user experiences discomfort as a result of energy reducing control, the user causes a determination result to be stored that indicates that discomfort was experienced.

The condition memory region 35b updates the conditions on the basis of the determination result stored in the amenity determination result memory region 35e. Specifically, the conditions are updated by varying the continuation time for energy reducing control that corresponds to the minimum capacity, or by varying the minimum capacity that corresponds to the continuation time. More specifically, the conditions are updated by reducing the continuation time for energy reducing control that corresponds to the minimum capacity, or by increasing the minimum capacity that corresponds to the continuation time.

The subordinate controllers 30, 30 thereby arrive at the optimum conditions on the basis of whether a user experiences discomfort as a result of energy reducing control.

(D)

The minimum capacity in the conditions used in the present embodiment may be set for each air conditioner. Specifically, different minimum capacities may be set according to the type of air conditioner and/or the location in which the air conditioner is installed. Energy can thereby be managed more appropriately.

(E)

In the present embodiment, the condition memory region 35b stores the prerequisites for the continuation time for energy reducing control and the minimum capacity for energy reducing control, and the reducing capability determining unit 36f determines an energy reducing capacity using the difference between the estimated consumption when energy reducing control is performed and the energy consumption when the control currently effect is continued. However, a configuration may be adopted in which the condition memory region 35b stores the continuation time for energy reducing control and the individual energy reducing capabilities of the equipment devices in a predetermined time, and the reducing capability determining unit 36f determines the energy reducing capability for the overall building (the sum of the individual energy reducing capabilities) for each condition, on the basis of the individual energy reducing capabilities of the equipment devices.

Second Embodiment

Figure 7:
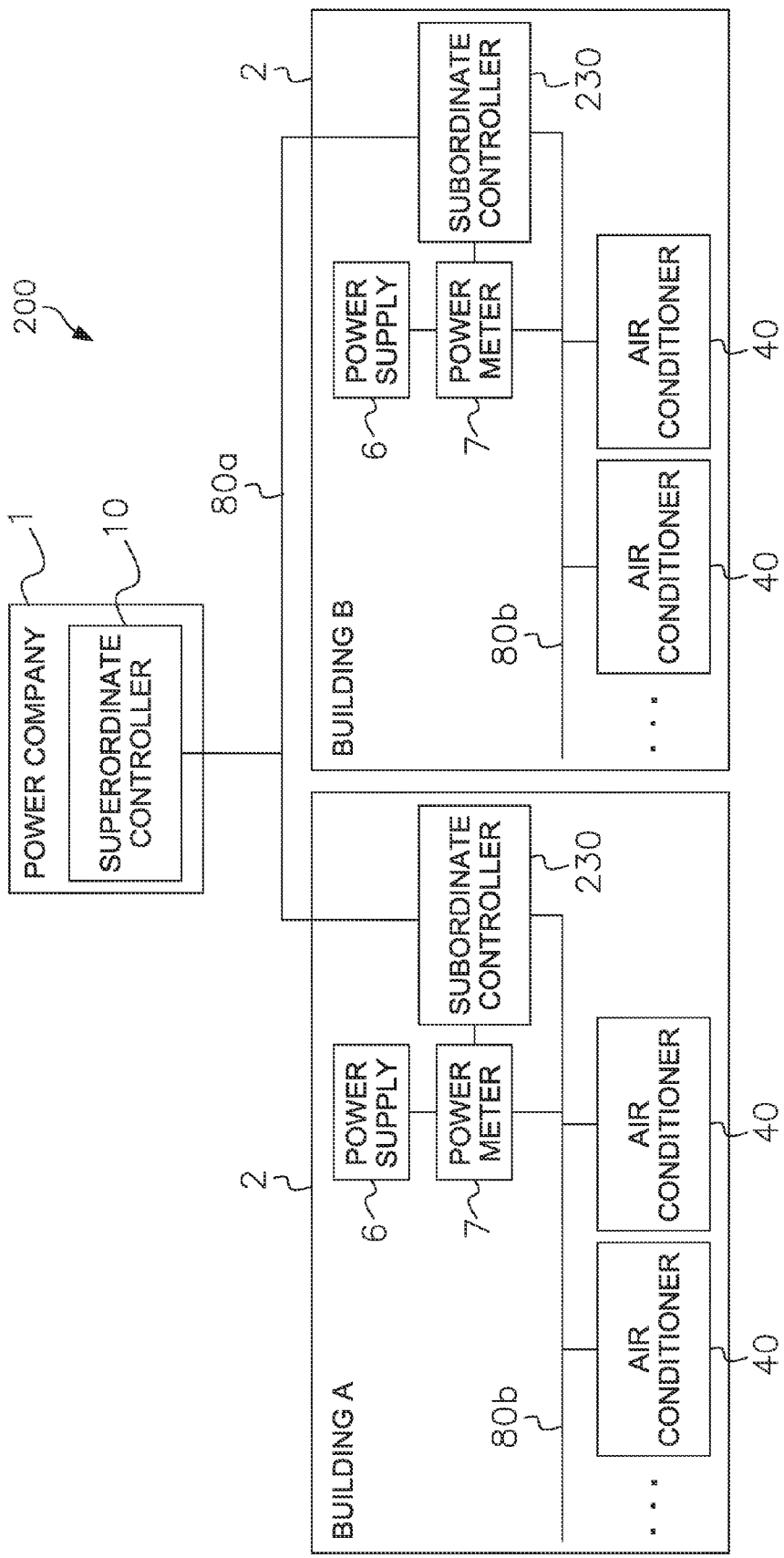
FIG. 7 is a view showing the configuration of the entire energy management system according to a second embodiment.

The energy management system 200 according to a second embodiment will next be described (with reference to FIG. 7). The energy management system 200 according to the second embodiment is configured in the same manner as the energy management system 100 of the first embodiment, except with regard to subordinate controllers 230, 230, The configuration of the subordinate controller 230 is therefore described below.

Figures 8, 9:
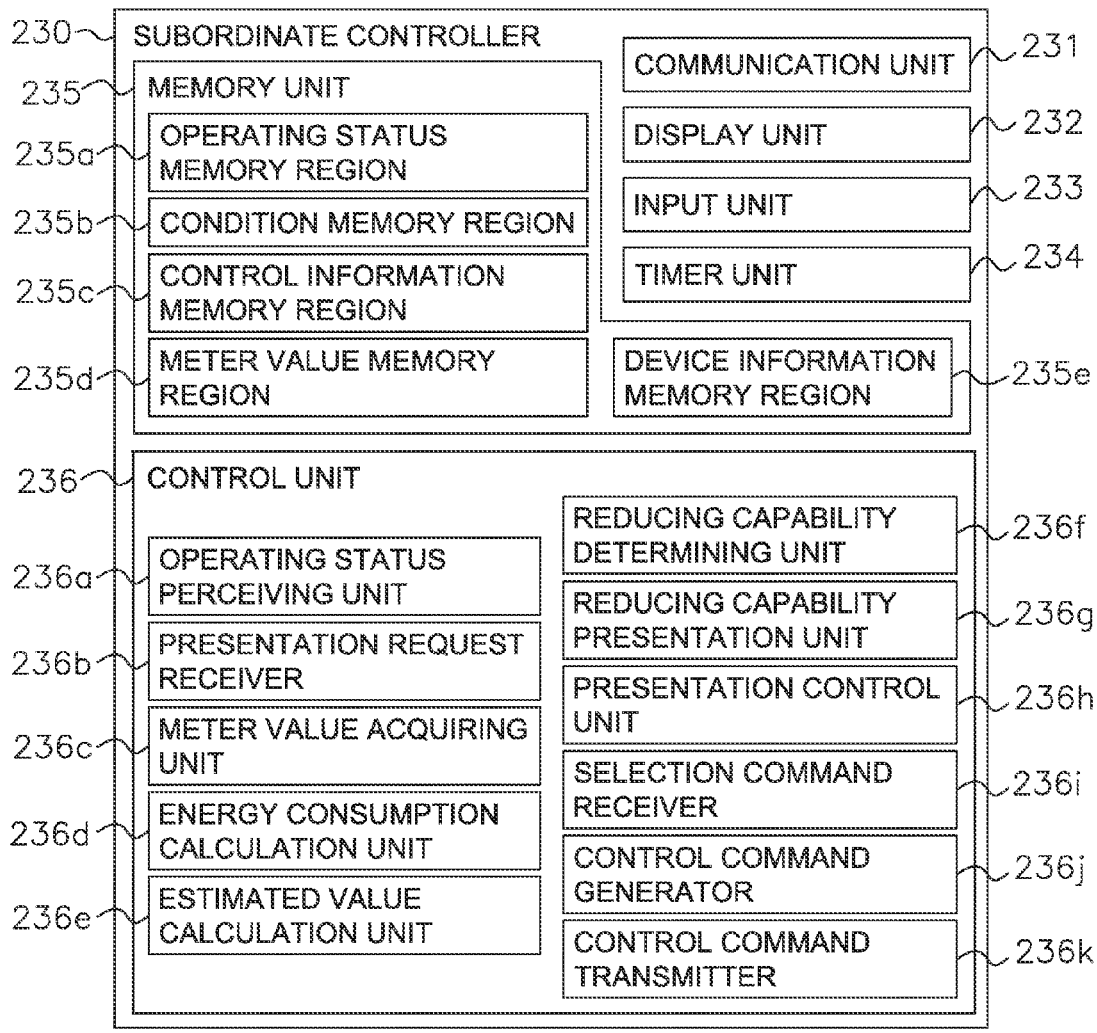
FIG. 8 is a view showing the general configuration of the subordinate controller according to the second embodiment.
FIG. 9 is a view showing an example of the conditions used in the second embodiment.

As shown in FIG. 8, the subordinate controller 230 is composed primarily of a communication unit 231, a display unit 232, an input unit 233, a timer unit 234, a memory unit 235, and a control unit 236, Here, the communication unit 231, the display unit 232, the input unit 233, and the timer unit 234 have the same configuration as the communication unit 31, the display unit 32, the input unit 33, and the tinier unit 34, respectively, of the first embodiment. The memory unit 235 and the control unit 236 are therefore described below.

(Memory Unit)

The memory unit 235 is composed primarily of a hard disk. The memory unit 235 stores a program that can be read and executed by the control unit 236 described hereinafter. The memory unit 235 also stores stability prediction information which is in accordance with the degree (stability) of divergence between the intake temperature and the set temperature. The stability prediction information is prediction information relating to the time needed to stabilize the state of air conditioning. Specifically, the time needed to stabilize the state of air conditioning is the time needed to cause the intake temperature to reach the set temperature when the intake temperature has not reached the set temperature.

The memory unit 235 also has, as main components, an operating status memory region 235a, a condition memory region 235b, control information memory region 235c, a meter value memory region 235d, and a device information memory region 235e. The control information memory region 235c and the meter value memory region 235d have the same configuration as the control information memory region 35c and the meter value memory region 35d, respectively, of the first embodiment. The operating status memory region 235a, the condition memory region 235b, and the device information memory region 235e are therefore described below.

a) Operating Status Memory Region

The operating status of the air conditioners 40, 40, and so on as acquired by an operating status perceiving unit 236a described hereinafter is stored in the operating status memory region 235a. Operating status for the air conditioners 40, 40, and so on includes such conditions as operating/stopped status, set temperature, intake temperature, running time, operation rate, and operating capacity (%) when working.

An air conditioning state (stability) perceived by the operating status perceiving unit 236a described hereinafter is also stored in the operating status memory region 235a. The stability is determined by whether the intake temperature of an air conditioner has reached the set temperature. Specifically, a stability of 100% means that the intake temperature has reached the set temperature.

b) Condition Memory Region

The condition memory region 235b stores conditions for presentation of the plurality of energy reducing capabilities by a reducing capability presentation unit 236g. The conditions for presenting the plurality of energy reducing capabilities are the prerequisites (second conditions) of the air conditioning state (stability) and the start time (response time) for energy reducing control. Specifically, a predetermined stability and a timing at which energy reducing control is possible with respect to the predetermined stability are associated with each other and stored. The timing at which energy reducing control is possible, associated with the predetermined stability, is determined in accordance with the stability prediction information described above (i.e., the time needed for the intake temperature to reach the set temperature). FIG. 9 shows an example of the conditions (conditions A through C) stored in the condition memory region 235b. Specifically, in condition A, energy reducing control is presupposed to begin after five minutes when the stability is 100%. In condition B, energy reducing control is presupposed to begin after fifteen minutes when the stability is 70%. In condition C, energy reducing control is presupposed to begin after thirty minutes when the stability is 50%.

c) Device Information Memory Region

Figures 10, 11, 12:
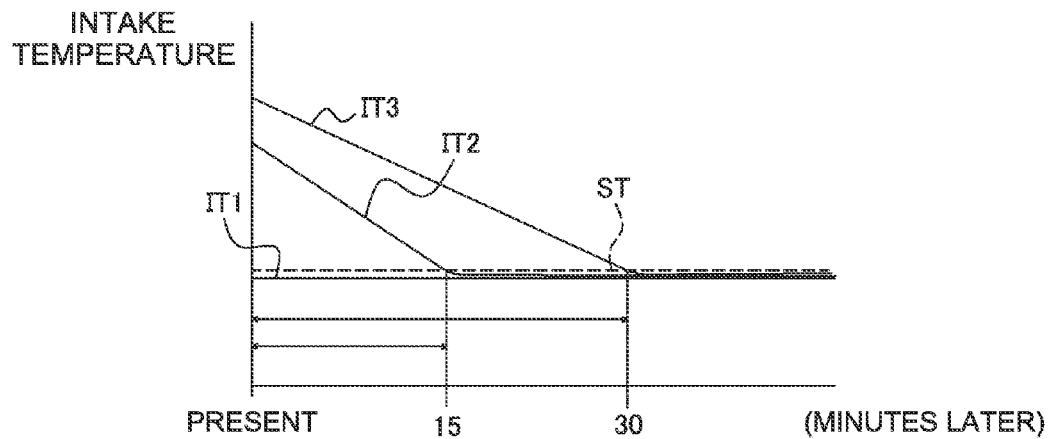
FIG. 10 is a view showing an example of the information stored in the device information memory region according to the second embodiment.
FIG. 11 is a view showing an example of the air conditioning states.
FIG. 12 is a view showing an example of the energy reducing capabilities presented to the superordinate controller from the subordinate controller in the second embodiment.

The energy consumption of the air conditioners 40, 40, and so on in a predetermined time (e.g., one minute) is stored in advance in the device information memory region 235e. For example, an energy consumption according to the type of air conditioner is stored in advance, as shown in FIG. 10. Here, the air conditioners 40, 40, and so on include air conditioners 1, 2, 3, and the energy consumptions of the air conditioners 1, 2, 3 are 25 kW, 50 kW, and 50 kW, respectively.

(Control Unit)

The control unit 236 is composed primarily of a CPU, ROM, and RAM, and the control unit 236 reads and executes a program stored in the memory unit 235.

The control unit 236 functions primarily as an operating status perceiving unit 236a, a presentation request receiver 236b, a meter value acquiring unit 236c, an energy consumption calculation unit 236d, an estimated value calculation unit 236e, a reducing capability determining unit 236f, a reducing capability presentation unit 236g, a presentation control unit 236h, a selection command receiver 236i, a control command generator 236j, and a control command transmitter 236k, as shown in FIG. 8. The presentation request receiver 236b, meter value acquiring unit 236c, reducing capability presentation unit 236g, presentation control unit 236h, selection command receiver 236i, control command generator 236j, and control command transmitter 236k are the same as the presentation request receiver 36b, meter value acquiring unit 36c, reducing capability presentation unit 36g, presentation control unit 36h, selection command receiver 36i, control command generator 36j, and control command transmitter 36k of the first embodiment. The operating status perceiving unit 236a, the energy consumption calculation unit 236d, the estimated value calculation unit 236e, and the reducing capability determining unit 236f are therefore described below.

a) Operating Status Perceiving Unit

The operating status perceiving unit 236a perceives the operating status of the air conditioners 40, 40, and so on at predetermined time intervals (five-minute intervals in the present embodiment). As described above, the operating status of the air conditioners includes such conditions as operating/stopped status, running time, operation rate, and operating capacity (%) when working. The operating status of the air conditioners 40, 40, and so on as perceived by the operating status perceiving unit 236a is stored in the operating status memory region 235a described above.

The operating status perceiving unit 236a also perceives a first state in which the air conditioning state is stable and a second state in which the air conditioning state is not stable, on the basis of the set temperature and the intake temperature. In the first state, the stability of the air conditioning state is 100%. The operating status perceiving unit 236a also perceives the percentage value of the current stability in accordance with the degree of divergence between the set temperature and the intake temperature.

FIG. 11 shows an example of the first state and second state perceived by the operating status perceiving unit 236a. In the example shown in FIG. 11, three air conditioners (air conditioners 1 through 3) are provided to a building. The vertical axis shows the intake temperature of the air conditioners 1, 2, 3, and the horizontal axis shows the time needed for the stability to reach 100%. The time needed for the stability to reach 100% is calculated on the basis of the stability perceived by the operating status perceiving unit 236a and the stability prediction information stored by the memory unit 235. The lines indicated by the reference symbols IT1 through IT3 indicate the predicted change in the intake temperatures of the air conditioners 1, 2, 3. The reference symbol IT1 refers to the intake temperature of the air conditioner 1, IT2 refers to the intake temperature of the air conditioner 2, and IT3 refers to the intake temperature of the air conditioner 3. The dashed line ST indicates the set temperature of the air conditioners 40, 40, and so on. Since the intake temperature IT1 of the air conditioner 1 has currently reached the set temperature ST, the operating status perceiving unit 36a perceives that the air conditioning state is stable (first state). Since the intake temperatures IT2, IT3 of the air conditioners 2, 3 have not reached the set temperature ST, the operating status perceiving unit 36a perceives that the air conditioning state is not stable (second state).

b) Energy Consumption Calculation Unit

The energy consumption calculation unit 236d calculates the energy consumption of the air conditioners 40, 40, and so on in a predetermined time for a case in which the control currently being performed is continued, on the basis of the current operating status of the air conditioners as perceived by the operating status perceiving unit 236a described above and on the data stored in the meter value memory region.

c) Estimated Value Calculation Unit

The estimated value calculation unit 236e calculates the amount of energy consumed (estimated consumption) when energy reducing control (second control) is performed in accordance with each condition, Specifically, the estimated value calculation unit 236e calculates the amount of energy consumed for each condition A through C on the basis of the stability of the air conditioners 40, 40, and so on as perceived by the operating status perceiving unit 236a, the start time (response time) associated with each stability, and the energy consumption of each of the air conditioners 40, 40, and so on.

For example, in the case that the operating status perceiving unit 236a perceives that the stability of the air conditioner 1 is 100%, the stability of the air conditioner 2 is 70%, and the stability of the air conditioner 3 is 50%, energy reducing control is started for the air conditioners 1 through 3 after five, fifteen, and thirty minutes, respectively (see FIG. 9). The estimated value calculation unit 236e calculates the estimated consumption for each case of energy reducing control in the air conditioners 1 through 3.

d) Reducing Capability Determining Unit

The reducing capability determining unit 236f determines energy reducing capabilities on the basis of the energy consumptions calculated by the energy consumption calculation unit 236d and on the basis of the estimated consumptions calculated by the estimated value calculation unit 236e. Specifically, the energy reducing capability determined is the difference between the energy consumption according to the current settings and the energy consumption (estimated consumption) for a case in which the current settings are changed according to a condition. More specifically, since the energy consumptions in a predetermined time of the air conditioners 1 through 3 are 25 kW, 50 kW, and 50 kW, respectively (see FIG. 10), the energy reducing capability after five minutes is 25 kW (energy consumption of the air conditioner 1), the energy reducing capability after fifteen minutes is 75 kW (total energy consumption of the air conditioners 1 and 2), and the energy reducing capability after thirty minutes is 125 kW (total energy consumption of the air conditioners 1 through 3) (see FIG. 12).

<Features>

In the present embodiment, by employing second conditions having as prerequisites the stability of the air conditioners 40, 40, and so on and the start time (response time) for energy reducing control, the degree of energy reducing when the air conditioning state in space is not stable is limited in a state in which the air conditioning state is not stable, such as immediately after the start of operation and/or immediately after the set temperature is changed, for example. Energy reducing can thereby be performed so as not to significantly affect the air conditioning state.

<Modifications>

(A)

In the present embodiment, second conditions are stored in the condition memory region 235b, but the first conditions of the first embodiment may also be stored in addition to second conditions in the condition memory region 235b. Numerous energy reducing capabilities can thereby be presented, and an energy reducing capability that is more preferred by both the power company it and the buildings A, B can be selected.

(B)

The associated response time is varied in accordance with the air conditioning state (stability) in the present embodiment, but a design may also be implemented in which there is no association with the object for which the energy reducing capability is determined in cases in which the air conditioning state is not stable, i.e., when the intake temperature has not reached the set temperature. A design may also be implemented in which the minimum capacity for an air conditioner having an unstable air conditioning state is temporarily changed to a value higher than the existing set value, an estimated consumption is calculated, and the energy reducing capability is subsequently determined, Energy reducing control can thereby be made less likely to create an uncomfortable environment.

(C)

The air conditioning state is perceived according to whether the intake temperature has reached the set temperature in the present embodiment, but the air conditioning state may be perceived by another method. For example, the air conditioning state may be determined to be stable when a predetermined time has elapsed since a change in a setting of the air conditioners 40, 40, and so on.

(D)

In the present embodiment, information relating to the energy consumption of each of the air conditioners 40, 40, and so on in a predetermined time is stored in advance in the device information memory region 235e, and the reducing capability determining unit 236f determines energy reducing capabilities using the difference between the estimated consumption when energy reducing control is performed and the energy consumption when the control currently in effect is continued. However, a configuration may be adopted in which the individual energy reducing capabilities of the air conditioners 40, 40, and so on in a predetermined time are stored in advance in the device information memory region 235e, and the reducing capability determining unit 236f determines the energy reducing capability for the overall building (the sum of the individual energy reducing capabilities) for each condition, on the basis of the individual energy reducing capabilities of the air conditioners 40, 40, and so on, (E)

In the present embodiment, the operating status perceiving unit 236a perceives the air conditioning state on the basis of the set temperature and the intake temperature, using the intake temperature as room temperature information. Here, the room temperature information may be a value obtained by another temperature sensor, instead of the intake temperature obtained by the intake temperature sensor. For example, temperature sensors provided separately to the air conditioners 40, 40, and so on and/or temperature sensors provided to remote controls of the air conditioners 40, 40, and so on or the like may be used. The value obtained from a temperature sensor may be used without modification, or a value may be used that is obtained by correcting the value obtained from a temperature sensor.

Third Embodiment

Figure 13:
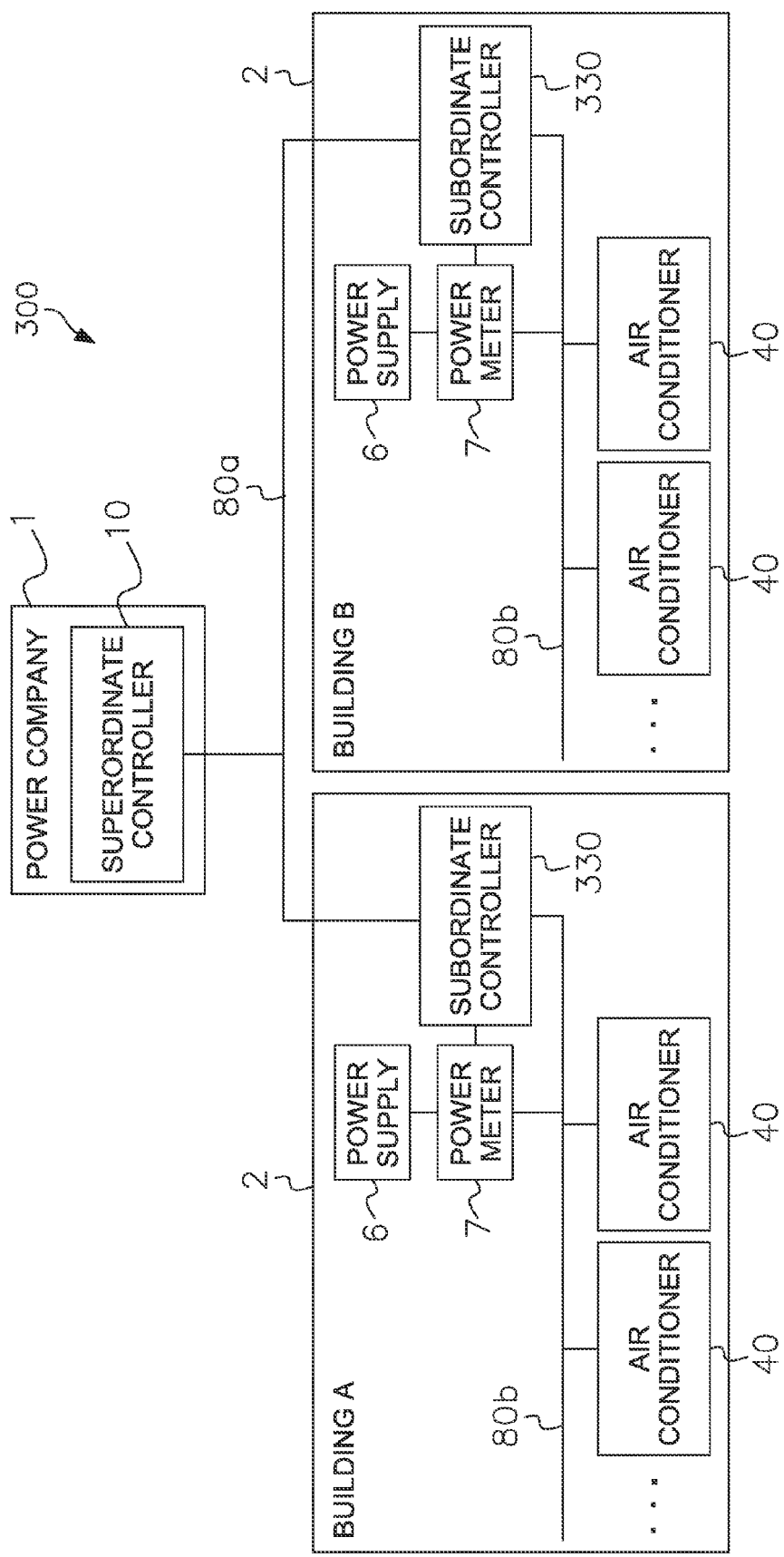
FIG. 13 is a view showing the configuration of the entire energy management system according to a third embodiment.

The energy management system 300 according to a third embodiment will next be described (with reference to FIG. 13). The energy management system 300 of the third embodiment is configured in the same manner as the energy management system 100 of the first embodiment, except with regard to subordinate controllers 330, 330. The configuration of the subordinate controller 330 is therefore described below.

As shown in FIB. 14, the subordinate controller 330 is composed primarily of a communication unit 331, a display unit 332, an input unit 333, a timer unit 334, a memory unit 335, and a control unit 336. Here, the communication unit 331, the display unit 332, the input unit 333, and the timer unit 334 have the same configuration as the communication unit 31, the display unit 32, the input unit 33, and the timer unit 34, respectively, of the first embodiment. The memory unit 335 and the control unit 336 are therefore described below.

(Memory Unit)

The memory unit 335 is composed primarily of a hard disk. The memory unit 335 stores a program that can be read and executed by the control unit 336 described hereinafter. The memory unit 335 also has, as main components, an operating status memory region 335a, a condition memory region 335b, a control information memory region 335c, a meter value memory region 335d, and a utilization schedule memory region 335e. The operating status memory region 335a, the control information memory region 335c, and the meter value memory region 335d have the same configuration as the operating status memory region 35a, the control information memory region 35c and the meter value memory region 35d, respectively, of the first embodiment. The condition memory region 335b and the utilization schedule memory region 335e are therefore described below.

a) Condition Memory Region

The condition memory region 335b stores conditions for presentation of the plurality of energy reducing capabilities by a reducing capability presentation unit 336g described hereinafter. The conditions for presenting the plurality of energy reducing capabilities are prerequisites (second conditions) relating to the start time (response time) of energy reducing. The energy reducing capability thereby varies for each response time stored in the condition memory region 335b.

b) Utilization Schedule Memory Region

Utilization schedules for the air conditioners 40, 40, and so on set for each of the buildings A, B are stored in the utilization schedule memory region 335e. In a utilization schedule, a plurality of time periods and a capacity of the air conditioners 40, 40, and so on that corresponds to each time period are associated and stored, as shown in FIG. 15. The capacity of the air conditioners 40, 40, and so on indicates the percent air-conditioning capacity that the air conditioners are operated at with respect to the rated capacity thereof. The air conditioners 40, 40, and so on in the present embodiment are basically controlled in accordance with the utilization schedule.

(Control Unit)

The control unit 336 is composed primarily of a CPU, ROM, and RAM, and the control unit 336 reads and executes a program stored in the memory unit 335 described above.

The control unit 336 functions primarily as an operating status perceiving unit 336a, a presentation request receiver 336b, a meter value acquiring unit 336c, an energy consumption calculation unit 336d, an estimated value calculation unit 336e, a reducing capability determining unit 336f, a reducing capability presentation unit 336g, a presentation control unit 336h, a selection command receiver 336i, a control command generator 336j, and a control command transmitter 336k, as shown in FIG. 14. The operating status perceiving unit 336a, presentation request receiver 336b, meter value acquiring unit 336c, reducing capability presentation unit 336g, presentation control unit 336h, selection command receiver 336i, control command generator 336j, and control command transmitter 336k are the same as the operating status perceiving unit 36a, presentation request receiver 36b, meter value acquiring unit 36c, reducing capability presentation unit 36g, presentation control unit 36h, selection command receiver 36i, control command generator 36j, and control command transmitter 36k of the first embodiment. The energy consumption calculation unit 336d, the estimated value calculation unit 336e, and the reducing capability determining unit 336f are therefore described below.

a) Energy Consumption Calculation Unit

The energy consumption calculation unit 336d calculates the energy consumption of the air conditioners 40, 40, and so on in a predetermined time for a case in which the control currently being performed is continued, on the basis of the current operating status of the air conditioners as perceived by the operating status perceiving unit 336a and on the data stored in the meter value memory region.

b) Estimated Value Calculation Unit

The estimated value calculation unit 336e calculates the amount of energy consumed (estimated consumption) when energy reducing control (second control) is performed in accordance with each condition. Specifically, information (allowed reduced capacity) is set in advance that relates to the degree to which the air conditioning capacity set in the utilization schedule can be reduced in accordance with the time period, and the energy consumption is estimated for a case in which the air conditioners 40, 40, and so on are operated at the allowed reduced capacity.

c) Throttling Capability Determining Unit

Figures 16, 17:
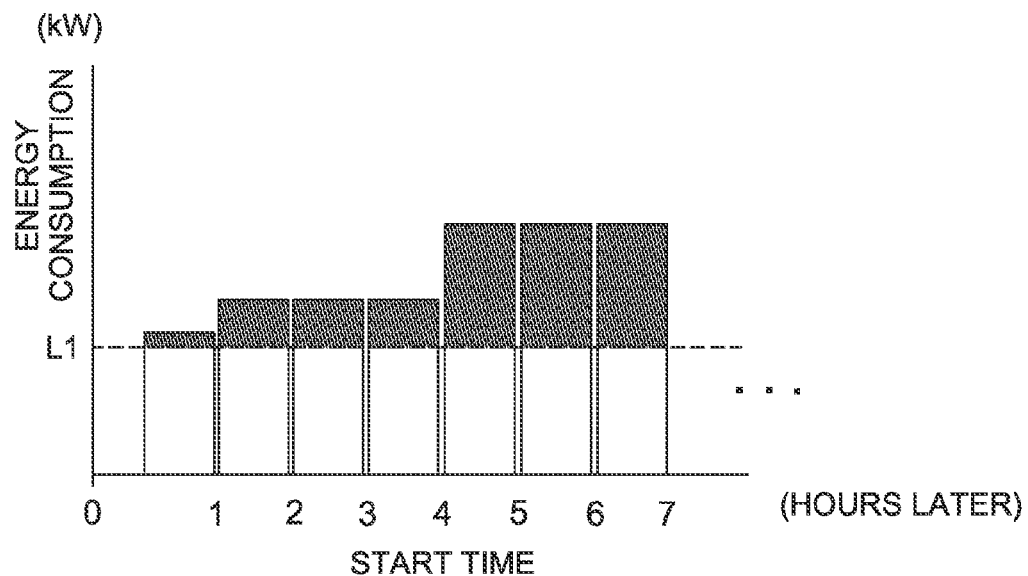
FIG. 16 is a view showing an example of the energy reducing capabilities and the estimated consumption in control at the allowed reduced capacity
FIG. 17 is a view showing an example of the energy reducing capabilities presented to the superordinate controller from the subordinate controller in the third embodiment.

The reducing capability determining unit 336f determines energy reducing capabilities on the basis of the energy consumptions calculated by the energy consumption calculation unit 336d and on the basis of the estimated consumptions calculated by the estimated value calculation unit 336e. The energy reducing capability that is determined by the reducing capability determining unit 336f when the allowed reduced capacity is constant, for example, will be described (see FIG. 16). The vertical axis of FIG. 16 shows the amount of energy consumed by control of the air conditioners 40, 40, and so on based on the utilization schedule, and the horizontal axis shows the start time of each control based on the utilization schedule. The dashed line L1 in FIG. 16 indicates the energy consumption at the allowed reduced capacity calculated by the estimated value calculation unit 336e. The reducing capability determining unit 336f determines the energy reducing capability as the difference (portions indicated by diagonal shading in FIG. 16) between the energy consumption and the estimated energy consumption. The reducing capability determining unit 336f thereby determines the start time for energy reducing control and the reducing capability for the corresponding start time (see FIG. 17).

<Features>

In the energy management system 300 of the embodiment described above, the subordinate controllers 330, 330 present energy reducing capabilities that reflect the utilization schedule to the superordinate controller 10. Specifically, energy reducing capabilities that conform to the control content can be presented, rather than significantly departing from the control particulars that are set for each of the buildings A, B. Consequently, in a case in which the buildings A, B represent a store chain having a plurality of stores, for example, the company or a parent company often sets a utilization schedule for the air conditioners 40, 40, and so on of each store in order to effectively manage each store. Even in this case, the buildings A, B can present energy reducing capabilities that are based on requests froth the company or parent company.

<Modifications>

(A)

In the present embodiment, the reducing capability determining unit 336f determines an energy reducing capability using the difference between the energy consumption for a case in which control based on the utilization schedule is continued and the estimated consumption for a case in which the air conditioners 40, 40, and so on are operated at the allowed reduced capacity. However, a configuration may be adopted in which the individual energy reducing capabilities of the air conditioners, based on the utilization schedule, are stored in advance in the memory unit 335, and the reducing capability determining unit 336f determines the energy reducing capability for the overall buildings (the sum of the individual energy reducing capabilities) for each condition, on the basis of the start time for energy reducing control and on the individual energy reducing capabilities that can be allowed at each corresponding start time.

Fourth Embodiment

Figure 18:
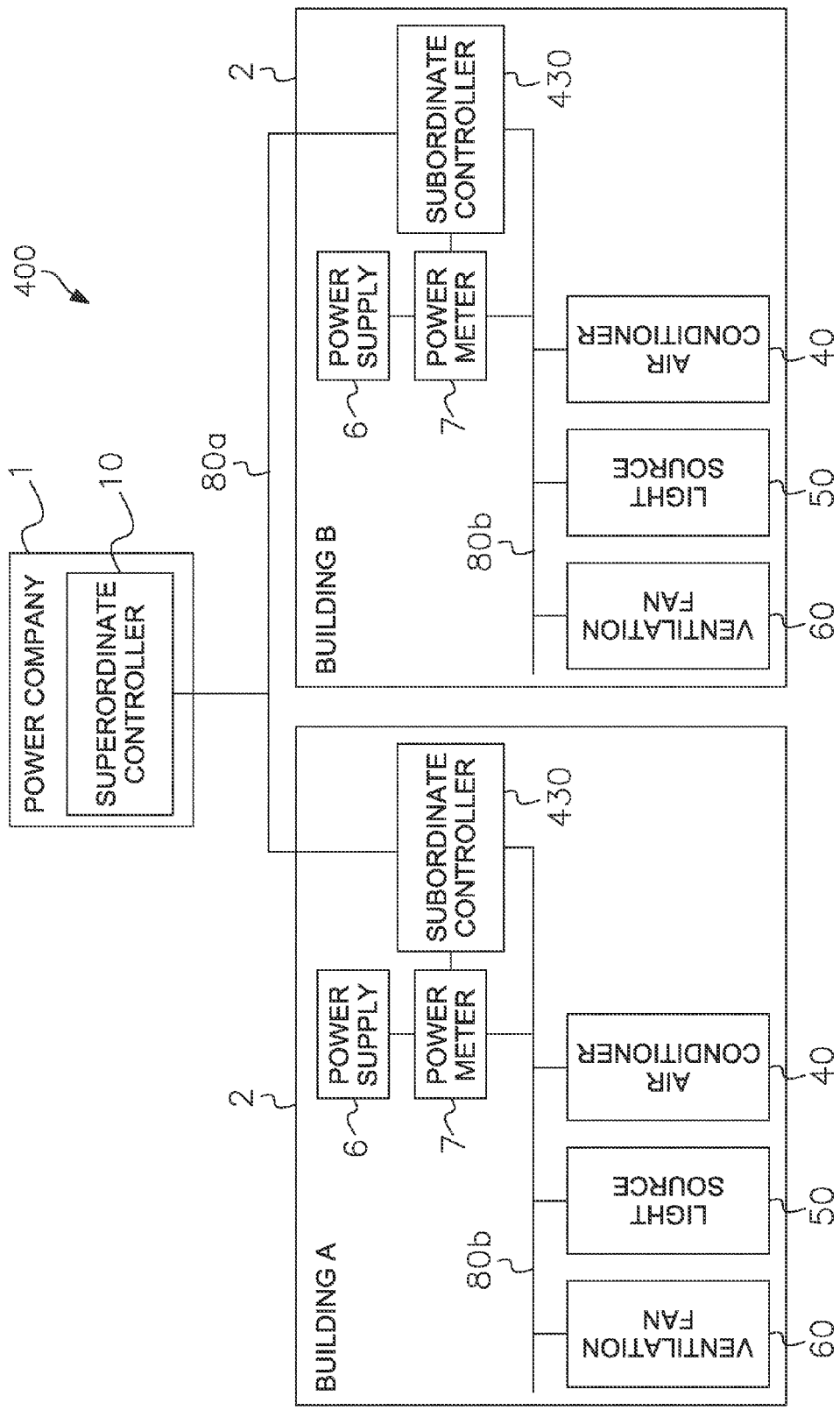
FIG. 18 is a view showing the configuration of the entire energy management system according to a fourth embodiment.

The energy management system 400 according to a fourth embodiment will next be described (with reference to FIG. 18). The energy management system 400 manages the energy consumed by air conditioners 40, 40, light sources 50, 50, and ventilation fans 60, 60 as equipment devices. The energy management system 400 is configured in the same manner as the energy management system 100 of the first embodiment, except with regard to subordinate controllers 430, 430. The configuration of the subordinate controller 430 is therefore described below.

Figures 19, 20:
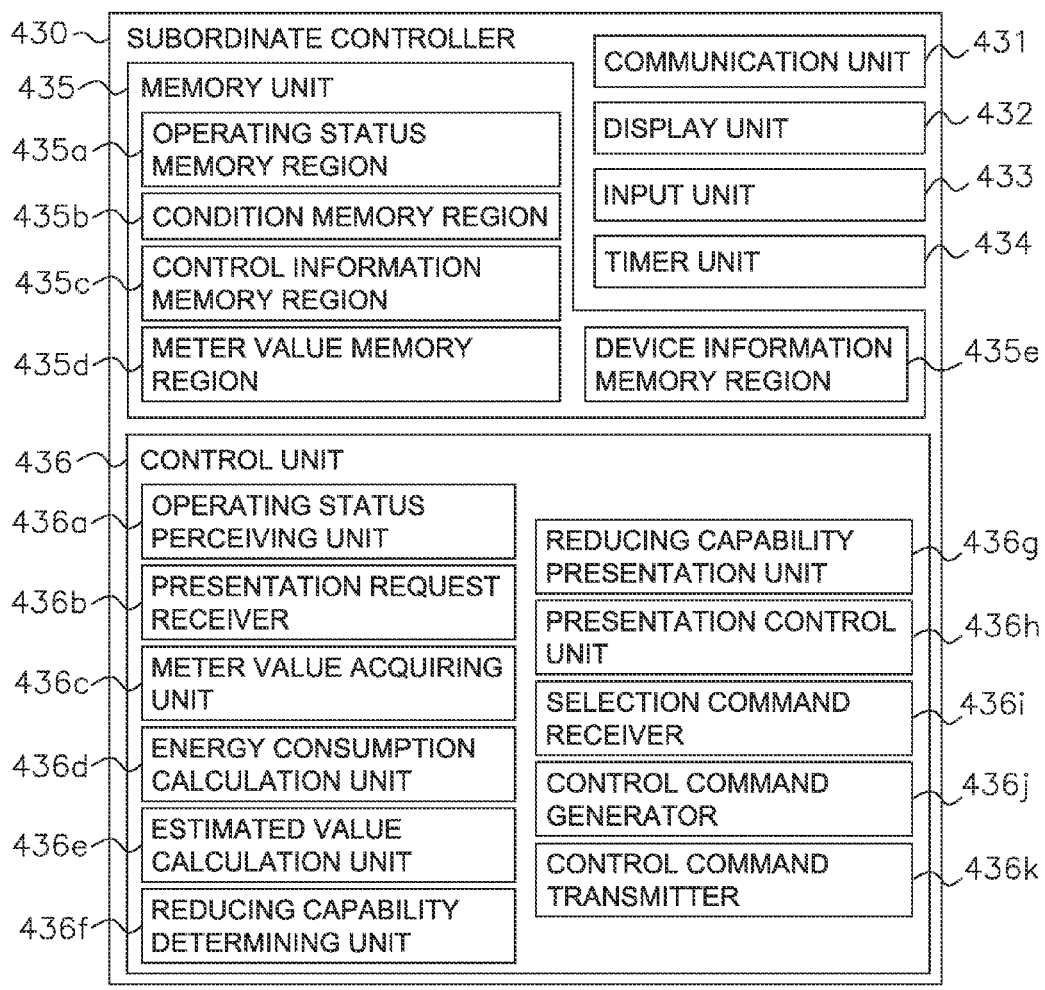
FIG. 19 is a view showing the general configuration of the subordinate controller according to the fourth embodiment.
FIG. 20 is a view showing an example of the information stored in the device information memory region according to the fourth embodiment.

As shown in FIG. 19, the subordinate controller 430 is composed primarily of a communication unit 431, a display unit 432, an input unit 433, a timer unit 434, a memory unit 435, and a control unit 436. Here, the communication unit 431, the display unit 432, the input unit 433, and the timer unit 434 have the same configuration as the communication unit 31, the display unit 32, the input unit 33, and the timer unit 34, respectively, of the first embodiment. The memory unit 435 and the control unit 436 are therefore described below.

(Memory Unit)

The memory unit 435 is composed primarily of a hard disk. The memory unit 435 stores a program that can be read and executed by the control unit 436 described hereinafter. The memory unit 435 also has, as main components, an operating status memory region 435a, a condition memory region 435b, a control information memory region 435c, a meter value memory region 435d, and a device information memory region 435e. The control information memory region 435c and the meter value memory region 435d have the same configuration as the control information memory region 35c and the meter value memory region 35d, respectively, of the first embodiment. The operating status memory region 435a, the condition memory region 435b and the device information memory region 435e are therefore described below.

a) Operating Status Memory Region

The operating status of the equipment devices as acquired by an operating status perceiving unit 436a described hereinafter is stored in the operating status memory region 435a, The equipment devices include air conditioners 40, light sources 50, and ventilation fans 60, as described above. Operating status for the equipment devices includes such conditions as operating/stopped status, running time, and operation rate. Operating status for the air conditioners 40 further includes such conditions as set temperature, intake temperature, and operating capacity (%) when working.

b) Condition Memory Region

The condition memory region 435b stores conditions for presentation of the plurality of energy reducing capabilities by a reducing capability presentation unit 436g described hereinafter. The conditions for presenting the plurality of energy reducing capabilities are prerequisites (second conditions) relating to the time (response time) at which energy reducing is started. The conditions are set while taking into account the potential response times of the plurality of types of equipment devices. Energy reducing capabilities thereby vary for each response time stored in the condition memory region 435b.

c) Device Information Memory Region

As shown in FIG. 20, the type of the equipment device provided in the building, the potential response time of the equipment device, and the energy consumption in a predetermined time of the equipment device are associated with each other and stored in the device information memory region 435e. The time at which a response is possible is the time at which energy reducing control can be started. Here, "light source," "air conditioner," or "other device" is stored as the type of equipment device. The other devices include the ventilation fans 60 shown in FIG. 18. When a selection command is sent from the superordinate controller 10, energy reducing control is possible immediately for the light sources 50, after five minutes for the air conditioners 40, and after fifteen minutes for the other devices 60. The energy consumption of the light sources 50 in a predetermined time is 25 kW. The energy consumption of the air conditioners 40 in a predetermined time is 50 kW. The energy consumption of the other devices in a predetermined time is 50 kW.

(Control Unit)

The control unit 436 is composed primarily of a CPU, ROM, and RAM, and the control unit 436 reads and executes a program stored in the memory unit 435 described above, The control unit 436 functions primarily as an operating status perceiving unit 436a, a presentation request receiver 436b, a meter value acquiring unit 436c, an energy consumption calculation unit 436d, an estimated value calculation unit 436e, a reducing capability determining unit 436f, a reducing capability presentation unit 436g, a presentation control unit 436h, a selection command receiver 436i, a control command generator 436j, and a control command transmitter 436k, as shown in FIG. 19, The presentation request receiver 436b, meter value acquiring unit 436c, reducing capability presentation unit 436g, presentation control unit 436h, selection command receiver 436i, control command generator 436j, and control command transmitter 436k are the same as the presentation request receiver 36b, meter value acquiring unit 36c, reducing capability presentation unit 36g, presentation control unit 36h, selection command receiver 36i, control command generator 36j, and control command transmitter 36k of the first embodiment. The operating status perceiving unit 436a, the estimated value calculation unit 436e, and the reducing capability determining unit 436f are therefore described below.

a) Operating Status Perceiving Unit

The operating status perceiving unit 436a perceives the operating status of the equipment devices 40, 50, 60 at predetermined time intervals (five-minute intervals in the present embodiment), As described above, the operating status of the equipment devices 40, 50, 60 includes such conditions as operating/stopped status, running time, and operation rate. Operating status for the air conditioners 40 includes such conditions as set temperature, intake temperature, and operating capacity (%) when working. The operating status of the equipment devices 40, 50, 60 as perceived by the operating status perceiving unit 436a is stored in the operating status memory region 435a described above, b) Energy Consumption Calculation Unit The energy consumption calculation unit 436d calculates the energy consumption of the equipment devices 40, 50, 60 in a predetermined time for a case in which the control currently being performed is continued, on the basis of the current operating status of the equipment devices as perceived by the operating status perceiving unit 436a and on the basis of the data stored in the meter value memory region, c) Estimated Value Calculation Unit The estimated value calculation unit 436e calculates the amount of energy consumed (estimated consumption) when energy reducing control (second control) is performed in accordance with each condition.

For example, in the case of executing energy reducing control immediately, since the light sources 50 are the only equipment devices for which energy reducing control can be performed, the energy consumption of the air conditioners 40 and the other devices is calculated as the estimated consumption. In the case of executing energy reducing control after five minutes, since the equipment devices for which energy reducing control can be performed are the light sources 50 and the air conditioners 40, the energy consumption of the other devices is calculated as the estimated consumption. Likewise, in the case of executing energy reducing control after fifteen minutes, since energy reducing control can be performed for all equipment devices, the estimated consumption for a case in which energy reducing control is performed for all equipment devices is calculated.

d) Throttling Capability Determining Unit

The reducing capability determining unit 436*f* determines energy reducing capabilities on the basis of the energy consumptions calculated by the energy consumption calculation unit 436*d* and on the basis of the estimated consumptions calculated by the estimated value calculation unit 436*e*. Specifically, the energy reducing capability determined is the difference between the energy consumption according to the current settings and the energy consumption for a case in which the current settings are changed according to a condition.

The reducing capability determining unit 436*f* determines the energy reducing capability that corresponds to each condition stored in the condition memory region 435*b*. Specifically, three energy reducing capabilities corresponding to the conditions A through C are determined in the present embodiment, as shown in FIG. 21.

<Features>

In the embodiment described above, the condition memory region 435*b* stores conditions which take into account the potential response times of the plurality of types of equipment devices. According to the type of equipment device, the characteristics of the device may allow energy reducing control to be performed instantaneously without malfunction, or a certain time may be required before energy reducing control is possible. Since the conditions stored in the condition memory region 435*b* in the present embodiment take into account the potential response times of the equipment devices, malfunctioning in the buildings A, B can be reduced.

<Modifications>

(A)

In the present embodiment, different potential response times are set for each type of equipment device, and conditions relating to each potential response time are stored in the condition memory region 435*b*. However, the potential response times may be set to different values according to the location at which the equipment device is provided.

(B)

In the present embodiment, the type of the equipment device provided in the building, the potential response time of the equipment device, and the energy consumption in a predetermined time of the equipment device are associated with each other and stored in the device information memory region 435*e*, and the reducing capability determining unit 436*f* determines an energy reducing capability using the difference between the estimated consumption for a case in which energy reducing control is executed and the energy consumption for a case in which the control currently in effect is continued. However, a configuration may be adopted in which the individual energy reducing capabilities of the equipment devices in a predetermined time, rather than the energy consumptions of the equipment devices in a predetermined time, are stored in advance in the device information memory region 435*e*, and the reducing capability determining unit 436*f* determines the energy reducing capability for the overall building (the sum of the individual energy reducing capabilities) for each condition, on the basis of the individual energy reducing capabilities.

Other Embodiments

A configuration may be adopted in which a lower controller is provided which stores all the conditions stored in the condition memory regions 35*b*, 235*b*, 335*b*, 435*b* of the first through fourth embodiments, and a plurality of energy reducing capability are presented that are determined on the basis of one or a plurality of conditions from among all the conditions.

INDUSTRIAL APPLICABILITY

The present invention is useful as an energy management system that works both to suppress energy consumption and to maintain amenity in each building.

What is claimed is:

1. An energy management system comprising:
   an energy management apparatus configured to manage energy supplied to equipment devices of a plurality of buildings, the energy management apparatus being located superordinate to the buildings; and
   a control apparatus configured to control the equipment devices in the buildings, the control apparatus being connected to the energy management apparatus, the control apparatus including
      an operating status perceiving unit configured to perceive operating status of the equipment devices,
      a reducing capability presentation unit configured to present a plurality of energy reducing capabilities for at least one condition to the energy management apparatus, the energy reducing capabilities being amounts of energy that can be reduced for the equipment devices based on the operating status perceived,
      a selection command receiver configured to receive any energy reducing capability that is selected by the energy management apparatus from among the presented energy reducing capabilities as a selection command, and
      a control command generator configured to generate a control command in order to realize any energy reducing capability selected by the energy management apparatus from among the energy reducing capabilities presented when the selection command is received by the selection command receiver,
   the equipment devices being air conditioners,
   the operating status perceiving unit perceiving, on the basis of set temperature and intake temperature of the air conditioners, a first state in which an air conditioning state of the air conditioners is stable and a second state in which the air conditioning state is not stable, and
   the reducing capability presentation unit presenting the energy reducing capabilities for each condition based on the air conditioning state.

2. The energy management system according to claim 1, wherein
   the at least one condition includes at least one of
      a first condition relating to a continuation time of energy reduction of the equipment devices and
      a second condition relating to a start time of the energy reduction, and the energy reducing capabilities vary in accordance with at least one of the continuation time of the energy reduction and the start time of the energy reduction.

3. The energy management system according to claim 2, wherein
the control apparatus further includes
an energy consumption calculation unit configured to calculate an energy consumption amount of energy consumed during a first control in which the energy reduction is not performed based on the operating status currently perceived by the operating status perceiving unit, and
an estimated consumption calculation unit configured to calculate an estimated consumption amount of energy consumed during a second control in which the energy reduction in accordance with the at least one condition is performed,
with the reducing capability presentation unit presenting the energy reducing capabilities based on the energy consumption amount and the estimated consumption amount.

4. The energy management system according to claim 2, wherein
the control apparatus further includes a memory unit configured to store individual energy reducing capabilities of the equipment devices, and
the reducing capability presentation unit presents the energy reducing capabilities for overall buildings based on
the equipment devices performing the energy reduction in accordance with the at least one condition, and
the individual energy reducing capabilities stored in the memory unit.

5. The energy management system according to claim 1, wherein
the operating status includes at least any one of an operation rate of the equipment devices, a type of the equipment devices operating, a running time of the equipment devices,
a load factor of the equipment devices, and an operating schedule of the equipment devices.

6. The energy management system according to claim 1, wherein
the control apparatus further includes
a presentation control unit configured to control presentation of the energy reducing capabilities by the reducing capability presentation unit, and
the presentation control unit includes
a first processor configured to restrict presentation of the energy reducing capabilities by the reducing capability presentation unit during a first predetermined time period after the control command is generated; and
a second processor configured to allow presentation of the energy reducing capabilities by the reducing capability presentation unit during a second time different from the first time.

7. The energy management system according to claim 6, wherein
the control apparatus further includes
a condition memory region configured to store the at least one condition, and
an amenity determination result memory region configured to store an amenity determination result inputted by a user,
with the condition memory region updating the at least one condition based on the determination result.

* * * * *